(12) United States Patent
Kim et al.

(10) Patent No.: US 11,497,072 B2
(45) Date of Patent: Nov. 8, 2022

(54) ELECTRONIC DEVICE AND METHOD FOR COMMUNICATION CONNECTION BASED ON LOW ENERGY IN ELECTRONIC DEVICE

(71) Applicant: Samsung Electronics Co., Ltd., Gyeonggi-do (KR)

(72) Inventors: Donghyeon Kim, Gyeonggi-do (KR); Doosu Na, Gyeonggi-do (KR); Wonkyoung Jang, Gyeonggi-do (KR); Sunkee Lee, Gyeonggi-do (KR); Yongsang Yun, Gyeonggi-do (KR); Bokun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 16/917,990

(22) Filed: Jul. 1, 2020

(65) Prior Publication Data

US 2021/0037582 A1 Feb. 4, 2021

(30) Foreign Application Priority Data

Jul. 31, 2019 (KR) .......................... 10-2019-0092901

(51) Int. Cl.
*H04W 4/00* (2018.01)
*H04W 76/15* (2018.01)
(Continued)

(52) U.S. Cl.
CPC ............. *H04W 76/15* (2018.02); *H04W 4/80* (2018.02); *H04W 76/11* (2018.02); *H04W 76/14* (2018.02)

(58) Field of Classification Search
CPC ....... H04W 76/15; H04W 76/14; H04W 4/80; H04W 76/11
(Continued)

(56) References Cited

U.S. PATENT DOCUMENTS 1,073,054 A * 9/1913 Legris et al. .......... B65G 21/14
198/813
9,020,433 B2 * 4/2015 Linde ...................... H04L 47/27
455/39
(Continued)

FOREIGN PATENT DOCUMENTS

| KR | 10-2011-0064528 A | 6/2011 |
|---|---|---|
| WO | 2014086388 A1 | 6/2014 |
| WO | 2018098136 A1 | 5/2018 |

OTHER PUBLICATIONS

International Search Report dated Nov. 5, 2020.
European Search Report dated May 10, 2022.

*Primary Examiner* — Marceau Milord
(74) *Attorney, Agent, or Firm* — Cha & Reiter, LLC

(57) ABSTRACT

According to an embodiment, an electronic device may include a Bluetooth communication circuit and at least one processor. The at least one processor may be configured to: perform a first communication connection based on a first Bluetooth communication with a first audio electronic device having a first Bluetooth address by using the Bluetooth communication circuit, receive, from a second audio electronic device having the first Bluetooth address, a second communication connection request based on the first Bluetooth communication while performing the first communication connection, transmit, to the second audio electronic device, a second communication connection request response signal including rejection information for the received second communication connection request by using the Bluetooth communication circuit due to the first communication connection, and transmit, to the first audio electronic device, a message related to the rejection information for the second communication connection request through the first communication connection. Other embodiments are possible.

20 Claims, 23 Drawing Sheets

(51) Int. Cl.
*H04W 4/80* (2018.01)
*H04W 76/11* (2018.01)
*H04W 76/14* (2018.01)

(58) Field of Classification Search
USPC .......................................................... 370/329
See application file for complete search history.

(56) References Cited

U.S. PATENT DOCUMENTS

| | | | |
|---|---|---|---|
| 9,338,638 B1 * | 5/2016 | Palin | H04W 4/80 |
| 9,451,436 B2 * | 9/2016 | Reunamaki | H04W 8/005 |
| 9,544,755 B2 * | 1/2017 | Palin | H04W 8/005 |
| 9,596,561 B2 * | 3/2017 | Heo | H04W 4/20 |
| 9,712,951 B2 * | 7/2017 | Kirshenberg | H04W 4/80 |
| 9,820,323 B1 * | 11/2017 | Young | H04L 65/4084 |
| 9,860,297 B2 * | 1/2018 | Palin | H04L 65/4084 |
| 9,949,063 B2 * | 4/2018 | Yong | H04W 48/16 |
| 10,299,300 B1 | 5/2019 | Young | |
| 10,412,565 B2 * | 9/2019 | Linsky | H04M 1/6066 |
| 10,420,072 B2 * | 9/2019 | Wentzloff | H04W 4/80 |
| 10,694,437 B2 * | 6/2020 | Jorgovanovic | H04M 1/72412 |
| 10,721,661 B2 * | 7/2020 | Jorgovanovic | H04B 17/318 |
| 10,728,941 B2 * | 7/2020 | Batta | H04M 1/6066 |
| 10,952,267 B2 * | 3/2021 | Song | H04W 8/005 |
| 11,190,923 B2 * | 11/2021 | Lee | H04W 76/14 |
| 11,212,657 B2 * | 12/2021 | Zhao | H04W 8/24 |
| 2011/0136434 A1 | 6/2011 | Choi | |
| 2012/0058727 A1 | 3/2012 | Cook et al. | |
| 2015/0133052 A1 | 5/2015 | Reunamaki et al. | |
| 2015/0327001 A1 * | 11/2015 | Kirshenberg | H04W 4/80 455/41.2 |
| 2015/0351143 A1 * | 12/2015 | Seymour | H04R 25/554 455/41.2 |
| 2015/0365780 A1 * | 12/2015 | Xie | H04M 1/72412 455/41.2 |
| 2016/0105924 A1 * | 4/2016 | Baek | H04W 76/10 455/41.2 |
| 2016/0157073 A1 * | 6/2016 | Ishikawa | G01C 13/00 455/404.1 |
| 2017/0093510 A1 | 3/2017 | Lin | |
| 2019/0103899 A1 * | 4/2019 | Lee | H04W 4/80 |
| 2019/0174557 A1 * | 6/2019 | Ueda | H04R 3/12 |
| 2020/0213830 A1 * | 7/2020 | Zhao | H04W 52/0274 |

* cited by examiner

ELECTRONIC DEVICE AND METHOD FOR COMMUNICATION CONNECTION BASED ON LOW ENERGY IN ELECTRONIC DEVICE

CROSS-REFERENCE TO RELATED APPLICATION(S)

This application is based on and claims priority under 35 U.S.C. § 119 to Korean Patent Application No. 10-2019-0092901, filed on Jul. 31, 2019, in the Korean Intellectual Property Office, the disclosure of which is incorporated by reference herein in its entirety.

BACKGROUND

Field

One or more embodiments disclosed herein generally relate to an electronic device and a communication connection between electronic devices.

Description of Related Art

Various electronic devices have been provided to users, and the users may access various contents while carrying these mobile electronic devices. These electronic devices may be connected with an external device using wireless network technology to provide various functions.

Recently, one such electronic device may use Bluetooth network technology, which is one of various wireless network interfaces. The Bluetooth network technology may include Bluetooth legacy (or classic) network technology or Bluetooth low energy (BLE) network technology, and have a topology of various connection forms such as piconet, scatternet, etc. For example, electronic devices may connect via Bluetooth communication to each other in various topologies such as 1:1, 1:N, or N:N. If an electronic device and another electronic device are connected 1:1, the electronic device and the other electronic device may be connected based on Bluetooth legacy or BLE, and one may act as a master while the other acts as a slave during the connection establishment phase.

SUMMARY

Conventionally, if electronic devices perform Bluetooth communication connection with each other, the electronic devices may perform a scan operation or an advertising operation. For example, after performing the scan operation, an electronic device may identify an external electronic device when an advertising signal is received from the external electronic device. A connection establishment operation may then be performed to connect the two devices. In a more specific example, if an electronic device (e.g., a smart phone) and a wireless earphone including a first audio electronic device (e.g., the first earphone) and a second audio electronic device (e.g., the second earphone) work together to output audio data through the Bluetooth communication connection, the first audio electronic device or the second audio electronic device may perform the connection establishment operation by performing the scan operation or the advertising operation.

When the first audio electronic device performs the scan operation, if the advertising signal is not received from the second audio electronic device because the second audio electronic device does not exist on the network, the first audio electronic device continuously performs the scan operation until the advertising signal is received, so unnecessary power consumption may occur. And when the second audio electronic device performs the advertising operation, if the second audio electronic device is not scanned by the first audio electronic device because the second audio electronic device does not exist on the network, the second audio electronic device enters the network to continuously perform the advertising operation until the scan of the first audio electronic device is successful, so unnecessary power consumption may occur.

According to an embodiment, an electronic device is provided, and the electronic device may include a Bluetooth communication circuit, an audio processing circuit, a memory, and at least one processor which is operatively connected with the Bluetooth communication circuit, the audio processing circuit, and the memory. The at least one processor may be configured to: perform a first communication connection based on a first Bluetooth communication with a first audio electronic device having a first Bluetooth address using the Bluetooth communication circuit, receive, from a second audio electronic device having the first Bluetooth address, a second communication connection request based on the first Bluetooth communication while performing the first communication connection, transmit, to the second audio electronic device, a response signal to the second communication connection request including rejection information for the received second communication connection request using the Bluetooth communication circuit due to the first communication connection, and transmit, to the first audio electronic device, a message related to the rejection information for the second communication connection request through the first communication connection.

According to an embodiment, an audio electronic device is provided, and the audio electronic device may include a Bluetooth communication circuit, an audio processing circuit, a memory, and at least one processor which is operatively connected with the Bluetooth communication circuit, the audio processing circuit, and the memory. The at least one processor may be configured to: perform a first communication connection based on a first Bluetooth communication by using a first Bluetooth address with an external electronic device through the Bluetooth communication circuit, and perform a scan or an advertising for a second communication connection based on a second Bluetooth communication with an external audio electronic device having the first Bluetooth address through the Bluetooth communication circuit after identifying existence of the external audio electronic device while performing the first communication connection.

According to an embodiment, an audio electronic device is provided, and the audio electronic device may include a Bluetooth communication circuit, an audio processing circuit, a memory, and at least one processor which is operatively connected with the Bluetooth communication circuit, the audio processing circuit, and the memory. The at least one processor may be configured to: transmit, to an external electronic device, a communication connection request signal based on a first Bluetooth communication and a first address stored in the memory, receive, from the external electronic device through the Bluetooth communication circuit, a communication connection request response signal including rejection information for a communication connection request using the first address due to a first communication connection using the first address already being established, identify existence of an external audio electronic device based on the communication connection request response signal, and perform a scan or an advertising to establish a second communication connection based on a second Bluetooth communication with the external audio electronic device through the Bluetooth communication circuit.

According to an embodiment, a method for a communication connection based on low energy in an electronic device is provided, and the method may include performing a first communication connection based on a first Bluetooth communication with a first audio electronic device having a first Bluetooth address using a Bluetooth communication circuit, receiving, from a second audio electronic device having the first Bluetooth address, a second communication connection request based on the first Bluetooth communication while performing the first communication connection, transmitting, to the second audio electronic device, a second communication connection request response signal including rejection information for the received second communication connection request using the Bluetooth communication circuit due to the first communication connection, and transmitting, to the first audio electronic device, a message related to the rejection information for the second communication connection request through the first communication connection.

According to an embodiment, a method for a communication connection based on low energy in an audio electronic device is provided, and the method may include performing a first communication connection based on a first Bluetooth communication by using a first Bluetooth address with an external electronic device using a Bluetooth communication circuit, identifying existence of an external audio electronic device having the first Bluetooth address while performing the first communication connection, and performing a scan or an advertising for a second communication connection based on a second Bluetooth communication with the external audio electronic device using the Bluetooth communication circuit after identifying the existence of the external audio electronic device.

According to an embodiment, a method for a communication connection based on low energy in an audio electronic device is provided, and the method may include transmitting, to an external electronic device, a communication connection request signal based on a first Bluetooth communication and a first address stored in a memory, receiving, from the external electronic device through a Bluetooth communication circuit, a communication connection request response signal including rejection information due to a first communication connection using the first address already being established, identifying existence of an external audio electronic device based on the communication connection request response signal, and performing a scan or an advertising to establish a second communication connection based on a second Bluetooth communication with the external audio electronic device through the Bluetooth communication circuit.

According to an embodiment, a storage medium (e.g., non-transitory computer-readable recording medium) storing commands is provided. The commands that, when executed by at least one processor, cause the at least one processor to perform at least one operation, and the at least one operation may include performing a first communication connection based on a first Bluetooth communication with a first audio electronic device having a first Bluetooth address using a Bluetooth communication circuit, receiving, from a second audio electronic device having the first Bluetooth address, a second communication connection request based on the first Bluetooth communication while performing the first communication connection, transmitting, to the second audio electronic device, a second communication connection request response signal including rejection information for the received second communication connection request using the Bluetooth communication circuit, and transmitting, to the first audio electronic device, a message related to the rejection information for the second communication connection request through the first communication connection.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

According to certain embodiments disclosed herein, an electronic device and a method for communication connection using low energy in the electronic device may be provided. In the electronic device and the method, a second audio electronic device provides information indicating that the second audio electronic device exists on a network during a Bluetooth connection communication with a first audio electronic device, thereby the first audio electronic device may perform a scan or advertising operation for a Bluetooth connection communication with the second audio electronic device based on whether the first audio electronic device exists on the network.

The terms used in the following description are only used to describe specific embodiments, and may not be intended to limit a scope of other embodiments. The singular forms may include the plural forms unless the context clearly indicates otherwise. The terms used herein, including technical or scientific terms, have the same meanings as terms that are generally understood by those skilled in the art of the present disclosure. The terms defined in a generally-used dictionary may be interpreted as having the same or similar meaning to the meaning in the context of the related technology, and is not interpreted as an ideal or excessively formal meaning unless explicitly defined in the following description. In some cases, even the terms defined in the following description may not be interpreted to exclude embodiments of the present disclosure.

Figure 1:
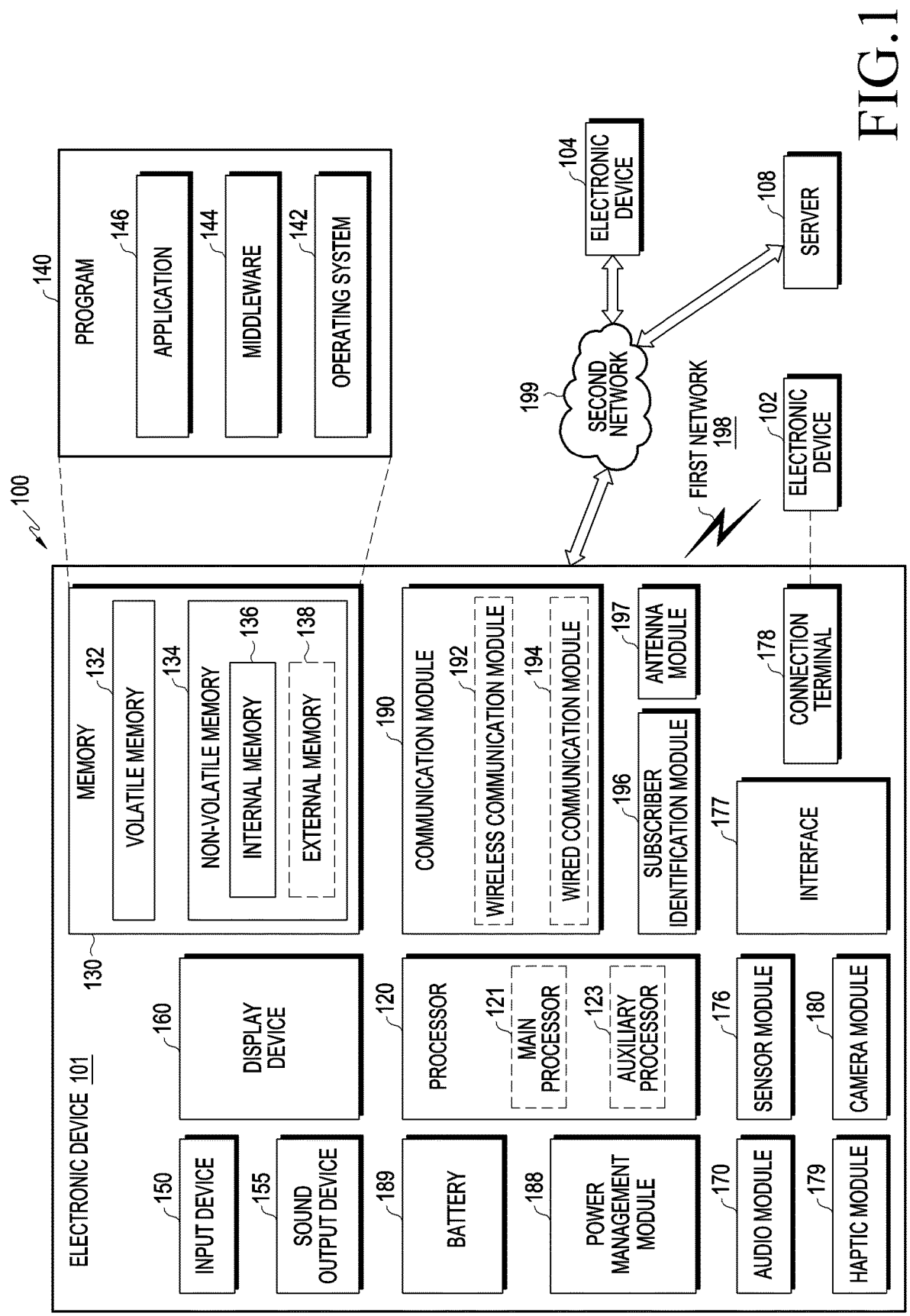
FIG. 1 is a block diagram of an electronic device within a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to an embodiment, the electronic device 101 may connect with an external audio electronic device using wireless network (e.g., Bluetooth) communication, and may transmit audio data to the external audio electronic device through the communication connection to be output.

Figure 2:
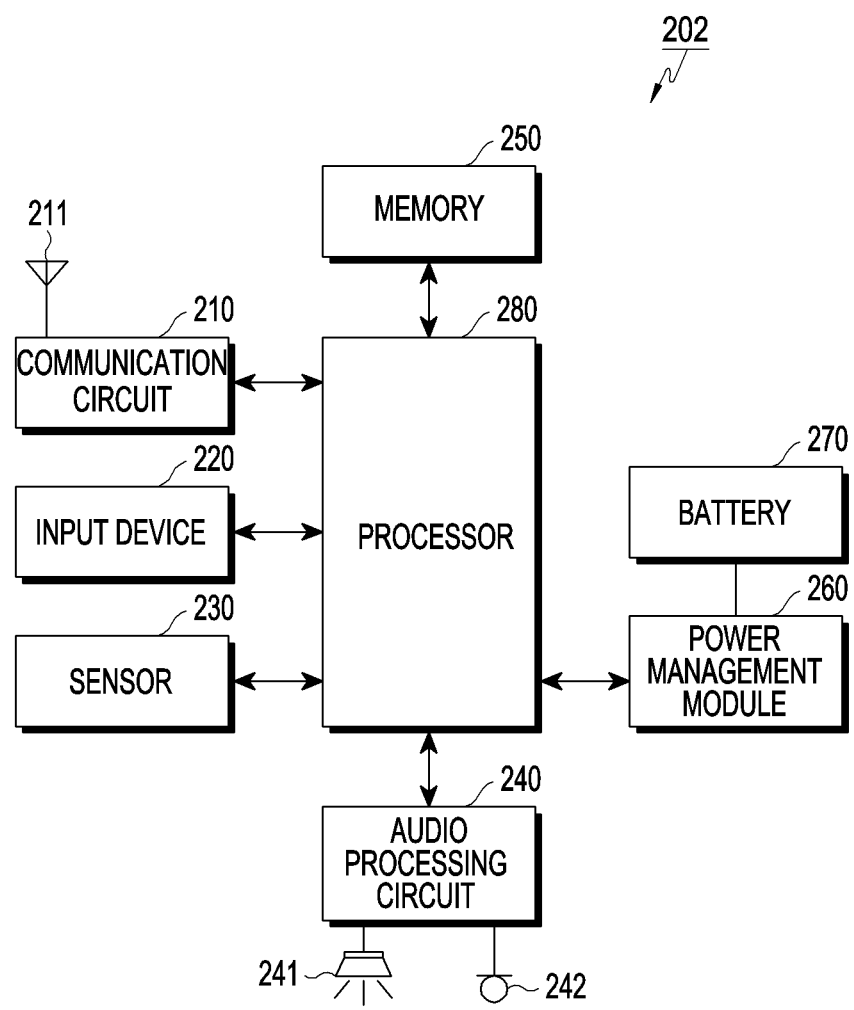
FIG. 2 is a block diagram of an audio electronic device according to an embodiment.

FIG. 2 is a block diagram of an audio electronic device according to an embodiment.

Referring to FIG. 2, an audio electronic device 202 according to an embodiment may be an ear wearable device (e.g., earphone, headset, or earbuds). The audio electronic device 202 according to an embodiment may include a communication module (or communication circuit) 210, an antenna 211, an input device 220, a sensor module (or sensor) 230, an audio processing module (or audio processing circuit) 240, a memory 250, a power management module (or power management circuit) 260, a battery 270 and a processor 280. The processor 280 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the communication circuit 210 may support wireless communication with an external electronic device (e.g., the electronic device 101 of FIG. 1). According to an embodiment, the communication circuit 210 may support various types of communications using the antenna 211.

According to an embodiment, the communication circuit 210 may support short-range communication. The short-range communication may include, for example, wireless fidelity (WiFi), Bluetooth, near field communication (NFC), or global navigation satellite system (GNSS). According to an embodiment, Bluetooth communication may include Bluetooth legacy (or classic) communication or Bluetooth low energy (BLE) communication.

According to an embodiment, the communication circuit 210 may include various RF components disposed between the antenna 211 and the processor 280. For example, when receiving a radio signal, the communication circuit 210 may receive the radio signal from the antenna 211, convert the received radio signal into a baseband signal, and transmit the converted baseband signal to the processor 280. The processor 280 may process the received baseband signal, and control a human/mechanical interface of the audio electronic device 202 corresponding to the received baseband signal. When transmitting a radio signal, the processor 280 may generate a baseband signal to output the baseband signal to the communication circuit 210. The communication circuit 210 may receive a baseband signal from the processor 280, convert the received baseband signal into a radio signal, and transmit the radio signal to air through the antenna 211. According to an embodiment, the communication circuit 210 may support reception of audio data (or audio contents) from an external electronic device (e.g., the electronic device 101 of FIG. 1). According to another embodiment, the communication circuit 210 may support transmission of audio data to another external audio electronic device (e.g., another ear wearable device).

According to an embodiment, the antenna 211 may be various types of metal members installed in the audio electronic device 202. According to an embodiment, the antenna 211 may be disposed inside a housing of the audio electronic device 202, or may form a part of one surface of the housing. According to an embodiment, if the housing is made of metal, the antenna 211 may be a part of the housing or the entirety of the housing. According to an embodiment, the antenna 211 may be mounted on a printed circuit board (PCB) (not shown) in which the communication circuit 210 is mounted. According to an embodiment, the antenna 211 may include a radiator (e.g., wireless charging coil) for supporting wireless charging. The antenna 211 may be used to transmit wireless power to an external device (e.g., a wireless power transceiver), or to receive power wirelessly from the external device.

According to an embodiment, the input device 220 may be configured to generate various input signals required to operate the audio electronic device 202. The input device 220 may include a touch pad, a touch panel, or a button. For example, the touch pad may recognize a touch input in at least one of capacitive, pressure-sensitive, infrared, or ultrasonic schemes. If a capacitive touch pad is provided, physical contact or proximity recognition may be possible. The touch pad may further include a tactile layer. The tactile layer may provide the user with tactile feedback. The button may include, for example, a physical button or an optical key. According to an embodiment, the input device 220 may detect a user input for turning the audio electronic device 202 on or off. According to an embodiment, the input device 220 may detect a user input to establish a communication (e.g., a Bluetooth communication) connection between the audio electronic device 202 and the external electronic device 101. According to an embodiment, the input device 220 may detect a user input related to audio data (or audio contents). For example, the user input may be related to a function such as starting playback of audio data, pausing playback, stopping playback, adjusting the playback speed, adjusting the playback volume, or muting. For example, the input device 220 may include a touch pad, and an operation of the audio electronic device 202 may be controlled by various gestures such as a gesture of tapping or swiping up and down on touch pad. According to an embodiment, when the gesture of a single tap is sensed through the touch pad, the audio electronic device 202 (or the processor 280) may play back audio data, or pause playback thereof. According to an embodiment, when the gesture of two taps is sensed through the touch pad, the audio electronic device 202 may play skip to the next track of audio data. According to an embodiment, when the gesture of three taps is sensed through the touch pad, the audio electronic device 202 may play back the previous track of audio data. According to an embodiment, when the gesture of swiping up or down is sensed through the touch pad, the audio electronic device 202 may adjust the volume of the playback. According to an embodiment, when a call is made to the electronic device 101 and the gesture of two taps is sensed through the touch pad, the audio electronic device 202 may cause the electronic device 101 to connect the call.

According to an embodiment, the sensor 230 may measure physical quantity or sense an operating state of the audio electronic device 202. The sensor 230 may convert the measured or sensed information into an electric signal. The sensor 230 may include, for example, an acceleration sensor, a gyro sensor, a geomagnetic sensor, a magnetic sensor, a proximity sensor, a gesture sensor, a grip sensor, or a bio sensor. According to an embodiment, the sensor 230 may sense information or a signal regarding whether the audio electronic device 202 is inserted into ears, or information or a signal regarding whether the audio electronic device 202 is coupled to an external device (e.g., a charging device). According to an embodiment, the audio electronic device 202 may further include a component to be sensed which corresponds to a sensor (not shown) of an external device (e.g., charging device or cradle to which the audio electronic device is connected). For example, the audio electronic device 202 may include a magnet sensed by a Hall IC installed in the external device, and when the audio electronic device 202 is coupled to the external device, the Hall IC of the external device may recognize the magnet installed in the audio electronic device 202, and output a signal regarding coupling between the external device and the audio electronic device 202. According to an embodiment, the audio electronic device 202 may be powered on or off depending on whether there is coupling between the external device and the audio electronic device 202.

According to an embodiment, the audio processing circuit 240 may support an audio data collection function. The audio processing circuit 240 may play back collected audio data. According to an embodiment, the audio processing circuit 240 may include an audio decoder (not shown) and a digital-to-analog (D/A) converter (not shown). The audio decoder may convert audio data stored in the memory 250 into a digital audio signal. The D/A converter may convert the digital audio signal converted by the audio decoder into an analog audio signal. According to an embodiment, the audio decoder may convert audio data which is received from the external electronic device 101 through the communication circuit 210 and stored in the memory 250 into a digital audio signal. A speaker 241 may output the analog audio signal converted by the D/A converter. According to an embodiment, the audio processing circuit 240 may include an analog-to-digital (A/D) converter (not shown). The A/D converter may convert an analog voice signal transferred through a microphone 242 into a digital voice signal. According to an embodiment, the audio processing circuit 240 may play back various audio data during the operation of the audio electronic device 202. For example, when it is sensed that the audio electronic device 202 is inserted into ears, or when it is sensed that the audio electronic device 202 is removed from the ears, the audio processing circuit 240 may be designed to play back audio data related to a corresponding sound effect or a guide sound. According to an embodiment, when it is sensed that the audio electronic device 202 is coupled to an external device (e.g., a charging device), or when it is sensed that the audio electronic device 202 is decoupled from the external device, the audio processing circuit 240 may be designed to play back audio data related to a corresponding sound effect or a guide sound. The output of the sound effect or guide sound may be omitted depending on user or manufacturer setting. According to an embodiment, the audio processing circuit 240 may be designed to be included in the processor 280.

According to an embodiment, the memory 250 may store data, or application program(s) and algorithm(s) which correspond to the operation of the audio electronic device 202. The memory 250 may include, for example, a high speed random access memory such as one or more magnetic disk storage devices, and/or a non-volatile memory, one or more optical storage devices, and/or a flash memory (e.g., NAND, and NOR). According to an embodiment, the memory 250 may include a non-volatile memory that stores first audio data (non-volatile audio data) received from the external electronic device 101. According to an embodiment, the memory 350 may include a volatile memory that stores second audio data (volatile audio data) received from the electronic device 101.

According to an embodiment, the power management circuit 260 (e.g., power management integrated circuit (PMIC)) may efficiently manage and optimize power use of the battery 270 within the audio electronic device 202. According to an embodiment, the processor 280 may transmit, to the power management circuit 260, a signal related to controlling the power management circuit 260 based on the load which the processor 280 needs to process. The power management circuit 260 may adjust power supplied to the processor 280. According to an embodiment, the power management circuit 260 may include a battery charging circuit. According to an embodiment, if the audio electronic device 202 is coupled to an external device (e.g., charging device), the power management circuit 260 may receive power from the external device to charge the battery 270. According to an embodiment, the power management circuit 260 may include a wireless charging circuit. The wireless charging circuit may wirelessly receive power from the external device through the antenna 211, and charge the battery 270 using the received power.

According to an embodiment, the audio electronic device 202 may include a display device (not shown). The display device may be configured to provide various graphic user interfaces required for operating the audio electronic device 202. The display device may provide user interface for playback of audio data. According to an embodiment, the display device may provide a user interface for the function of receiving audio data from the electronic device 101 or the function of transmitting audio data to the electronic device 101. According to an embodiment, the display device may include light emitting means such as a light emitting diode (LED). For example, the light emitting means may be controlled to emit light of various colors which corresponds to the charging of the battery 270 or the completion of the charging. For example, if the audio electronic device 202 is in communication with the electronic device 101, the light emitting means may be controlled to emit light of a specific color. In another example, according to the playback state of audio data (e.g., while playback is in progress or while playback is paused), the light emitting means may be controlled to emit light of a specific color. In yet another example, according to a user input detect by the input device 220, the light emitting means may be controlled to emit light of a specific color.

According to an embodiment, the processor 280 may be configured to control various operations such as controlling various signal flows for audio data playback, collecting information for audio data playback, or outputting information for audio data playback. The processor 280 may support various operations that are initiated by user input from the input device 220. According to an embodiment, the processor 280 may turn on or off the audio electronic device 202 according to the user input.

According to an embodiment, the processor 280 may enable the audio electronic device 202 to communicate with the electronic device 101 according to user input. According to an embodiment, the processor 280 may receive audio data from the electronic device 101, or transmit audio data to the electronic device 101 according to user input. According to an embodiment, while being connected to the electronic device 101 and another audio electronic device, the audio electronic device 202 may output, through the speaker 241, the audio signal received from the electronic device 101, and transmit, to the other audio electronic device, information that the other audio electronic device may use to obtain an audio signal of the electronic device 101. According to an embodiment, while being connected to the electronic device 101 and the other audio electronic device, the audio electronic device 202 may output, through the speaker 241, the audio signal received from the electronic device 101, and transmit, to the other audio electronic device, the audio signal received from the electronic device 101.

According to an embodiment, the processor 280 may play back audio data or control playback of the audio data according to user input (for example, start the playback of the audio data, pause the playback, stop the playback, adjust the playback speed, or adjust the playback volume, or muting). The processor 280 may receive audio data from the electronic device 101 through the communication circuit 210 and store the received audio data in the memory 250. According to an embodiment, the processor 280 may receive non-volatile audio data (or downloaded audio data) from the electronic device 101 and store the received non-volatile audio data in a non-volatile memory. According to an embodiment, the processor 280 may receive volatile audio data (or streaming audio data) from an external device and store the received volatile audio data in a volatile memory. According to an embodiment, the processor 280 may play back audio data (e.g., non-volatile audio data or volatile audio data) stored in the memory 250 and output the audio data through the speaker 241. During the playback operation, the processor 280 may decode the audio data to obtain an audio signal. The processor 280 may output the obtained audio signal through the speaker 241. According to an embodiment, the processor 280 may receive an audio signal from the electronic device 101 and output the received audio signal through the speaker 241. During the playback operation, the electronic device 101 may decode audio data to obtain an audio signal. The electronic device 101 may transmit the obtained audio signal to the audio electronic device 202. The processor 280 may perform various operations based on at least part of information obtained from the sensor 230. According to an embodiment, the processor 280 may identify whether the audio electronic device 202 is inserted into ears based on the information obtained from the sensor 230. When it is identified that the audio electronic device 202 is inserted into the ears, the processor 280 may play back audio data stored in the memory 250 according to a user input for playing back the audio data and output the audio data through the speaker 241. According to an embodiment, in the mode in which the audio electronic device 202 receives audio data from an external device, and plays back the audio data to output the audio data through the speaker 241, when it is identified that the audio electronic device 202 is not inserted into ears, the processor 280 may stop playback and/or transmit, to the electronic device 101, a signal regarding the fact that the audio electronic device 202 is not inserted into the ears. The electronic device 101 may receive the signal regarding the fact that the audio electronic device 202 is not inserted into the ears, and stop transmitting audio data to the audio electronic device 202. According to an embodiment, in the mode in which the audio electronic device 202 receives an audio signal from the electronic device 101 and outputs the audio signal through the speaker 241, when it is identified that the audio electronic device 202 is not inserted into ears, the processor 280 may stop the playback and/or transmit, to an external device, a signal regarding the fact that the audio electronic device 202 is not inserted into the ears. The electronic device 101 may receive the signal regarding the fact that the audio electronic device 202 is not inserted into the ears, and may stop playback of audio data and transmission of an audio signal. According to an embodiment, when it is identified that the audio electronic device 202 is inserted into the ears, the processor 280 may activate a biometric sensor (e.g., heart rate sensor). When it is identified that the audio electronic device 202 is not inserted into the ears, the processor 280 may deactivate the biometric sensor.

According to an embodiment, the audio electronic device 202 may provide a voice recognition function to detect a voice command from an analog voice signal received using the microphone 242. The voice command may be related to an input regarding reception, transmission, or playback of audio data.

According to an embodiment, the audio electronic device 202 may further include various other modules not shown. There are many variations on the components that may be included, so it is impossible to enumerate all of the components. But at least components equivalent or similar to components described above may be further included in the audio electronic device 202. Further, in the audio electronic device 202 according to an embodiment, certain sub-components of the components described above may be excluded or replaced with other components. This can be easily understood by those skilled in the art.

According to an embodiment, the audio electronic device 202 may operate as one of a pair of audio electronic devices, for example, as a first audio electronic device (e.g., first earphone, main earphone, or right earphone) or as a second audio electronic device (e.g., second earphone, secondary earphone, or left earphone).

Figure 3:
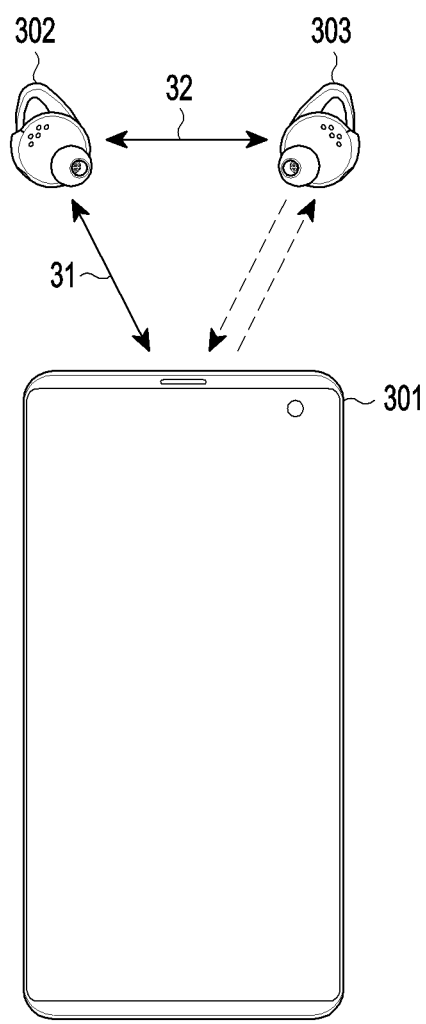
FIG. 3 is a diagram illustrating an electronic device, a first audio electronic device, and a second audio electronic device according to an embodiment.

FIG. 3 is a diagram illustrating an electronic device, a first audio electronic device, and a second audio electronic device according to an embodiment.

Referring to FIG. 3, an electronic device 301 according to an embodiment (e.g., the electronic device 101 of FIG. 1) may perform a first communication connection 31 which is based on a first Bluetooth communication (Bluetooth legacy) with a first audio electronic device 302 (e.g., first earphone, main earphone, or right earphone). The electronic device 301 may transmit, to the first audio electronic device 302, audio data or an audio signal through the first communication connection 31 with the first audio electronic device 302 so that the audio data or the audio signal may be output through a speaker (e.g., speaker 241 of FIG. 2) of the first audio electronic device 302.

The first audio electronic device 302 according to an embodiment may perform a second communication connection 32 which is based on a second Bluetooth (BLE) communication with a second audio electronic device 303 (e.g., second earphone, secondary earphone, or left earphone) while performing the first communication connection 31 with the electronic device 301. The first audio electronic device 302 according to an embodiment may transmit, to the second audio electronic device 303, audio data or an audio signal received from the electronic device 301 through the second communication connection 32, or may transmit, to the second audio electronic device 303, information related to the first communication connection 31 so as to allow the second audio electronic device 303 to obtain the audio data or the audio signal from the electronic device 301. For example, the information related to the first communication connection 31 may include at least one of address information (e.g., Bluetooth address, and/or logical transport (LT) address), clock information (e.g., Bluetooth piconet clock, and/or Master's clock native (CLKN)), channel information (e.g., used channel map), service discovery protocol (SDP) result information, information about a supported function (e.g., supported feature), key information (e.g., a Bluetooth link key), or an extended inquiry response (EIR) packet. For example, the information related to the first communication connection 31 may include information for the second audio electronic device 303 to obtain (e.g., sniff) the audio data or the audio signal from the electronic device 301. According to an embodiment, the information related to the first communication connection 31 may be transmitted to the second audio electronic device 303 through an external server (e.g., the server 108 of FIG. 1).

The second audio electronic device 303 according to an embodiment may receive audio data or audio signal transmitted from the first audio electronic device 302 based on the second communication connection 32, or may obtain (or sniff) audio data or audio signal transmitted from the electronic device 301 based on information related to the first communication connection 31. The second audio electronic device 303 may synchronize the audio data or the audio signal transmitted from the first audio electronic device 302, or the audio data or the audio signal obtained from the electronic device 301 with the first audio electronic device 302, and output the synchronized audio data or audio signal through a speaker (e.g., speaker 241 in FIG. 2).

According to an embodiment, the first audio electronic device 302 and the second audio electronic device 303 may perform the second communication connection 32 by performing pairing which is based on the second Bluetooth (BLE) communication, and one of the first audio electronic device 302 and the second audio electronic device 303 may operate as the master device, and the other may operate as the slave device. Roles of the first audio electronic device 302 and the second audio electronic device 303 may be determined at the time of manufacture, determined by manufacturer setting, determined by a user input, or determined according to which device is first paired with the electronic device 301 (e.g., the first paired device may be the master device). According to an embodiment, the first audio electronic device 302 and the second audio electronic device 303 may store the address or/and one or more attributes of each other. For example, each of the first audio electronic device 302 and the second audio electronic device 303 may store the address or/and attribute of each other in a memory during manufacture, or receive the address or/and attribute of each other through communication and store them in the memory. For example, the second audio electronic device 303 may receive information (e.g., address) of the electronic device 301 to which the first audio electronic device 302 is connected through an external device (e.g. a server) without being connected with the first audio electronic device 302.

Figure 4:
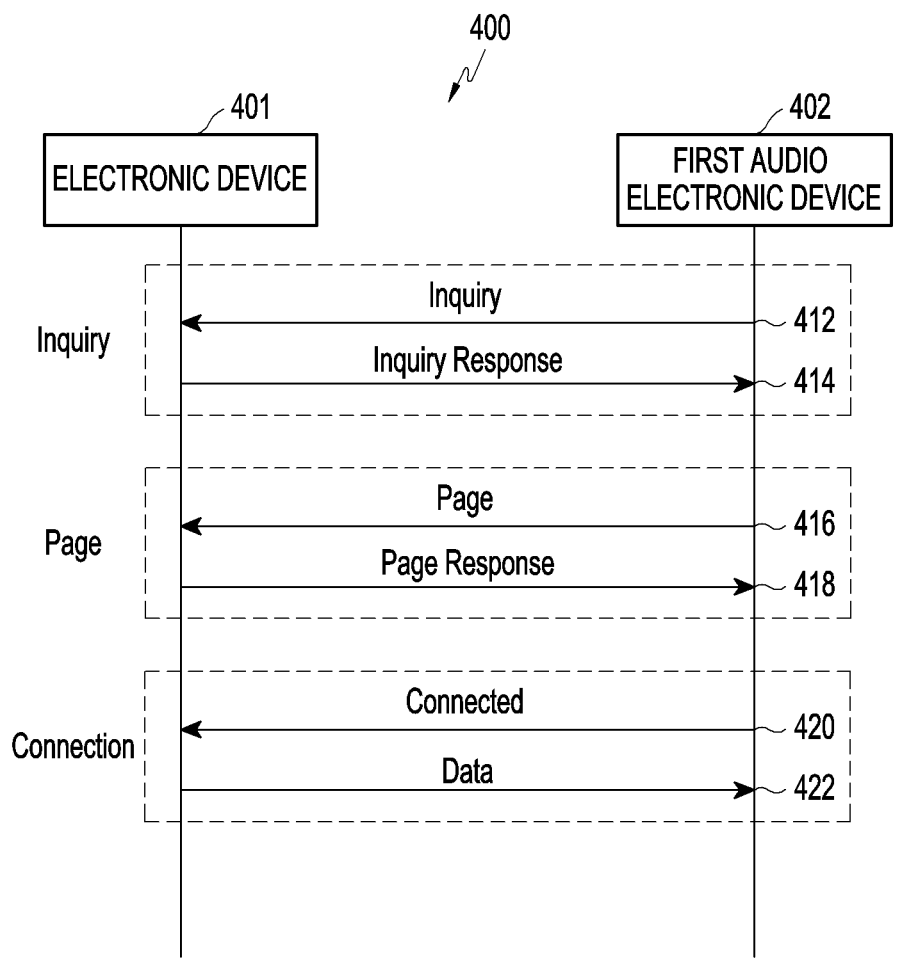
FIG. 4 is a diagram illustrating an operation of performing a first communication connection which is based on a first Bluetooth communication between an electronic device and a first audio electronic device according to an embodiment.

FIG. 4 is a diagram 400 illustrating an operation of performing a first communication connection which is based on a first Bluetooth communication between an electronic device and a first audio electronic device according to an embodiment.

Referring to FIG. 4, an electronic device 401 according to an embodiment (e.g., the electronic device 101 of FIG. 1 or the electronic device 301 of FIG. 3) and a first audio electronic device 402 (e.g., the electronic device 102 of FIG. 1, the audio electronic device 202 of FIG. 2, or the first audio electronic device 302 of FIG. 3) may perform a first Bluetooth (Bluetooth legacy) communication connection through inquiry, paging, and connection operations.

In operation 412, the first audio electronic device 402 may enter an inquiry mode and output an inquiry signal for identifying (or searching for) a peripheral device. For example, the first audio electronic device 402 may enter a peripheral device search mode for the first Bluetooth (Bluetooth legacy) communication connection by a user request, at power-on, or if a peripheral device search is required, and may output an inquiry signal in the peripheral device search mode.

In operation 414, when receiving the inquiry signal, the electronic device 401 may transmit an inquiry response signal which responds to the inquiry signal, and enter a page (or paging) mode to start a page scan.

In operation 416, the first audio electronic device 402 may enter the paging mode to transmit a page signal as the inquiry response signal is received from the electronic device 401.

In operation 418, the electronic device 401 may transmit a page response signal as the page signal is received from the first audio electronic device 402.

In operation 420, after receiving the page response signal from the electronic device 401, the first audio electronic device 402 may transmit, to the electronic device 401, a connected signal indicating that it is connected.

In operation 422, the electronic device 401 may transmit data to the first audio electronic device 402 as the connected signal is received from the first audio electronic device 402.

According to an embodiment, each of the electronic device 401 and the first audio electronic device 402 may have a unique Bluetooth address (BR_ADDR) (Bluetooth device address), and the first communication connection may be performed based on the first Bluetooth communication using the BR_ADDR of each other.

Figure 5:
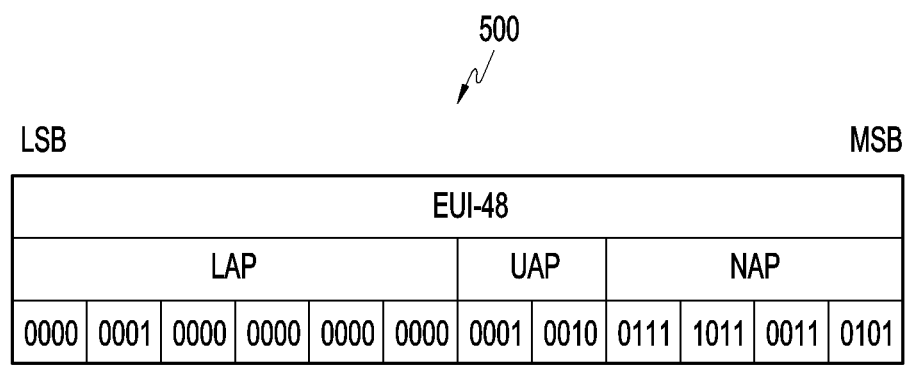
FIG. 5 is a diagram illustrating BR_ADDR according to an embodiment.

FIG. 5 is a diagram illustrating BR_ADDR according to an embodiment. Referring to FIG. 5, BR_ADDR 500 according to an embodiment may be a 48 bit-unique address of a Bluetooth device. For example, the BR_ADDR 500 may include a lower address part (LAP), a upper address part (UAP), and a non-significant address part (NAP). The LAP may indicate the device address designated by the manufacturer, and the UAP and the NAP may indicate the device address which is designated to the manufacturer by the Institute of Electrical and Electronics Engineers (IEEE). BD_ADDR may be used for identification of a specific electronic device, determination of a frequency hopping channel, authentication, or computation for link operation.

Electronic devices supporting the Bluetooth protocol may insert different access codes into packets according to uses thereof. An access code may include, for example, device access code (DAC), inquiry access code (IAC), and channel access code (CAC). The access code may be generated based on BD_ADDR of a specific electronic device. The IAC may be used for discovering nearby external electronic devices. The IAC may include general IAC (GIAC) and dedicated IAC (DIAC). The GIAC may be generated based on a LAP having a fixed value (e.g., 0×9E8B33), and the DIAC may be generated based on a LAP having a value within a designated range (e.g., 0×9E8B00 to 0×9E8B3F). The DAC may be used for requesting a connection. In this case, the DAC may be generated based on a LAP of an electronic device which receives a request for a connection. The CAC may be used for data communication when two or more electronic devices are connected (e.g., state in which a link (e.g., a first communication connection 31 or a second communication connection 32 in FIG. 3) is established). The CAC may be generated based on a LAP of a master device.

The electronic device 401 may have unique BR_ADDR of the electronic device 401, and the first audio electronic device 402 may have unique BR_ADDR of the first audio electronic device 402.

Figure 6:
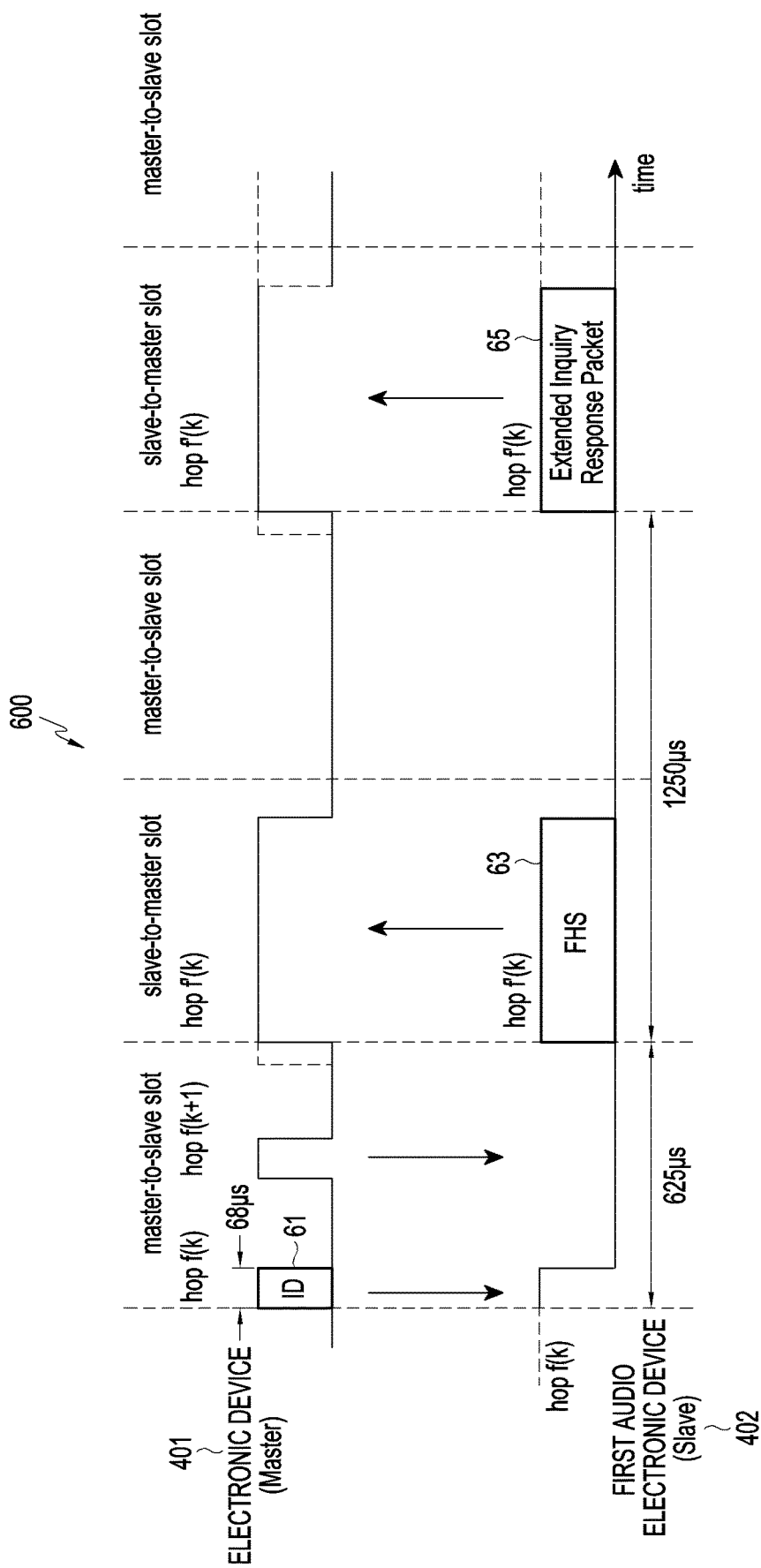
FIG. 6 is a diagram illustrating an example of an inquiry sequence between an electronic device and a first audio electronic device according to an embodiment.

FIG. 6 is a diagram 600 illustrating an example of an inquiry sequence between an electronic device and a first audio electronic device according to an embodiment.

Referring to FIG. 6, an electronic device 401 according to an embodiment may operate as the master device, and a first audio device 402 may operate as the slave device. For example, the master device and the slave device may transmit and receive a packet based on a time slot of 625 µs. The electronic device 401 according to an embodiment may continuously transmit an identification (ID) packet 61 which is generated based on the general inquiry access code (GIAC) during the designated inquiry period, and the first audio electronic device 402 may receive the ID packet 61 transmitted by the electronic device 401 by performing an inquiry scan. For example, the ID packet may include access code such as inquiry access code (IAC), device access code (DAC), or channel access code (CAC).

When the ID packet 61 is received, the first audio device 402 according to an embodiment may transmit, to the electronic device 401, a frequency hop synchronization (FHS) packet 63 in response to the ID packet 61. For example, the FHS packet 63 may include BR_ADDR of the audio electronic device 401, class of device (COD) indicating the type of the audio electronic device 401, extended inquiry response (EIR) bit indicating that there is a next packet including more information, or clock information of the audio electronic device 402. After transmitting the FHS packet 63, the audio electronic device 402 according to an embodiment may further transmit an extended inquiry response (EIR) packet 65 to the electronic device 401 if there is a next packet including more information. The electronic device 401 according to an embodiment may display, in a user interface (UI) on a display (e.g., the display device 160 of FIG. 1), information about the searched-for first audio electronic device 402 according to the reception of the FHS packet 63.

Figure 7:
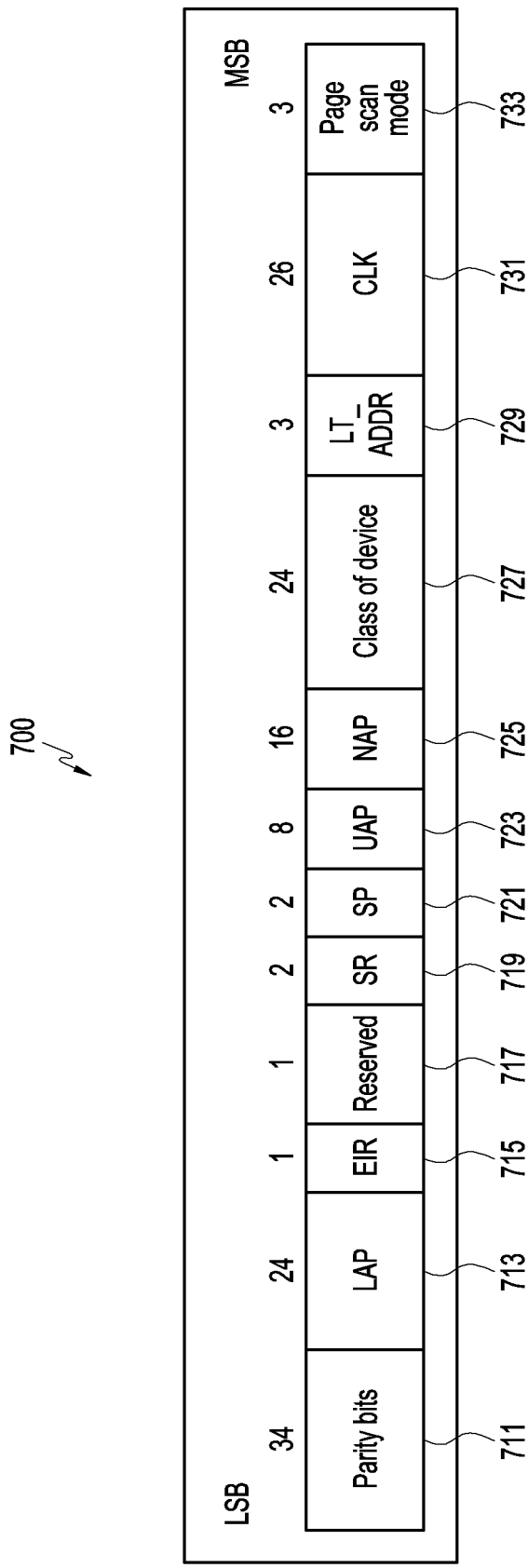
FIG. 7 is a diagram illustrating an example of an FHS packet format according to an embodiment.

FIG. 7 is a diagram illustrating an example of an FHS packet format according to an embodiment.

Referring to FIG. 7, an FHS packet 700 according to an embodiment may include parity bits field 711, lower address part (LAP) field 713, extended inquiry response (EIR) field 715, reserved field 717, scan repetition (SR) field 719, scan period (SP) field 721, upper address part (UAP) field 723, non-significant address part (NAP) field 725, class of device field 727, logical transport address (LT_ADDR) field 729, clock (CLK) field 731, and/or page scan mode field 733.

According to an embodiment, the parity bits field 711, the LAP field 713, the EIR field 715, the reserved field 717, the SR field 719, the SP field 721, the UAP field 723, the NAP field 725, the class of device field 727, the LT_ADDR field 729, the a CLK field 731, and/or the page scan mode field 733 may be fields included in one or more Bluetooth specifications, and those skilled in the art may refer to the Bluetooth specifications for the specific configuration of each field.

According to an embodiment, the first audio electronic device 402 may provide the electronic device 401 with at least one of BR_ADDR, Type, or clock information of the first audio electronic device 402 using the FHS packet, and inform that an EIR packet including more information will be transmitted through the EIR 715 field.

Figure 8:
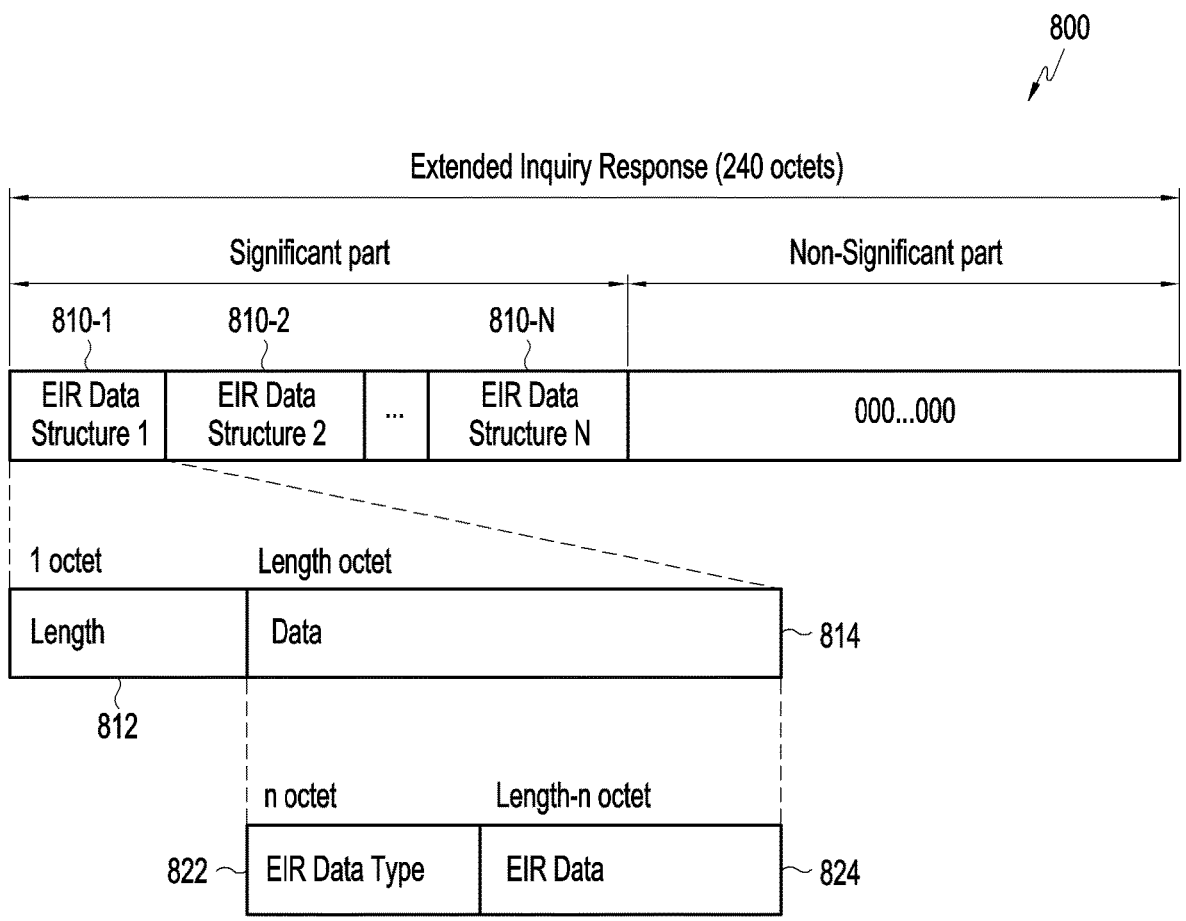
FIG. 8 is a diagram illustrating an example of an EIR packet format according to an embodiment.

FIG. 8 is a diagram illustrating an example of an EIR packet format according to an embodiment.

Referring to FIG. 8, the EIR Packet 800 according to an embodiment may include a plurality of EIR data structures 810-1 to 810-$n$, and each EIR data structure (e.g., EIR data structure 810-1) may have a length field 812 and a data field 814.

According to an embodiment, the data field 814 may include EIR data type 822 and EIR data 824. According to an embodiment, the audio electronic device 402 may transmit, to an electronic device 401, various information to be used for a Bluetooth connection and service such as device name, transmission power information (tx power level), service class information (service class UUIDs), or manufacturer information (manufacture's data) of the audio electronic device 402 using the EIR data type 822 and the EIR data 824. According to an embodiment, the electronic device 401 may provide various services related to a Bluetooth communication as well as a Bluetooth communication connection based on the EIR Packet 800 received in the inquiry operation.

Figure 9:
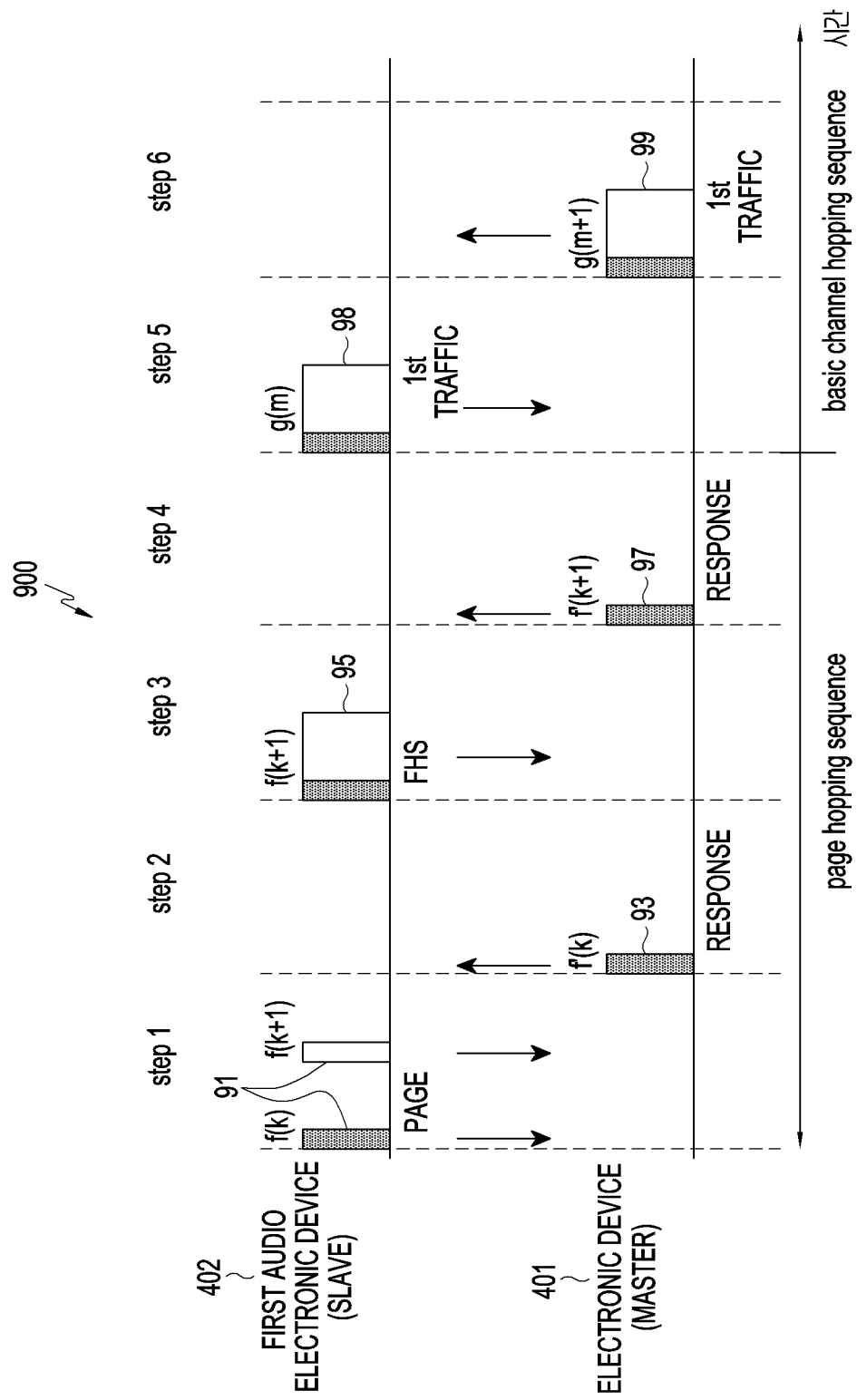
FIG. 9 is a diagram illustrating an example of a paging sequence between an electronic device and a first audio electronic device according to an embodiment.

FIG. 9 is a diagram 900 illustrating an example of a paging sequence between an electronic device and a first audio electronic device according to an embodiment.

Referring to FIG. 9, the electronic device 401 according to an embodiment may operate as a master device, and the first audio electronic device 402 may operate as a slave device. The first audio electronic device 402 according to an embodiment may compute a DAC using the Bluetooth device address (BD_ADDR) of the electronic device 401 which is the target for a connection request, and transmit, to the electronic device 401, an ID Packet 91 including the computed DAC to request a connection.

According to an embodiment, the first audio electronic device 402 may determine a transmission period for the ID Packet 91 in consideration of Task Priority, power source, and/or battery capacity, and transmit the ID Packet 91 at the determined transmission period. According to an embodiment, the first audio electronic device 402 may continuously transmit the ID Packet 91 during time of 1.28 s*4 or 1.28 s*5 to perform a connection request. For example, the first audio electronic device 402 may compute a hopping channel based on the BD_ADDR of the electronic device 401 to transmit the ID packet 91 twice per slot (0.625 ms). Here, the first audio electronic device 402 may compute the hopping channel so that a response to the ID packet 91 which is transmitted in the previous slot may be received in the next slot, and perform a Rx operation twice to identify whether there is a response from the electronic device 401.

According to an embodiment, the electronic device 401 may perform page scan at predetermined periodic time intervals using BD_ADDR of the electronic device 401. For example, the electronic device 401 may perform a page scan every 11.25 ms/1.28 s period. The page scan period may be changed according to power source or/and battery capacity of the electronic device 401. According to an embodiment, the electronic device 401 may open 32 channels every 1.28 second interval according to the scheme defined in a Bluetooth specification when performing the page scan. When the ID packet 91 which corresponds to the BD_ADDR of the electronic device 401 is received through an opened channel, the electronic device 401 may transmit an ID packet response 93 in the same ID packet through a corresponding channel.

According to an embodiment, when the ID packet response 93 is received from the electronic device 401, the first audio electronic device 402 may transmit an FHS packet 95 to the electronic device 401. For example, the FHS packet 95 may include at least one of BD_ADDR, clock information, or logical transport (LT) address of the first audio electronic device 402.

According to an embodiment, when the FHS packet 95 is received, the electronic device 401 may transmit an ID packet 97 indicating that the FHS packet 95 is correctly received.

According to an embodiment, as the ID packet 97 is received from the electronic device 401, the first audio electronic device 402 may compute a hopping channel using clock information shared with the electronic device 401 and the BD_ADDR of the first audio electronic device 402 and transmit a first traffic packet 98 (e.g., first POLL packet) through the computed hopping channel. As the first traffic packet 98 is received from the first audio electronic device 402, the electronic device 401 may transmit a first traffic packet response 99 in response to the first traffic packet 98. In this way, the first audio electronic device 402 transmits the first traffic packet 98 and the electronic device 401 transmits the first traffic packet response 99, thereby a first basic rate (BR)/enhanced data rate (EDR) communication connection may be formed.

Figure 10:
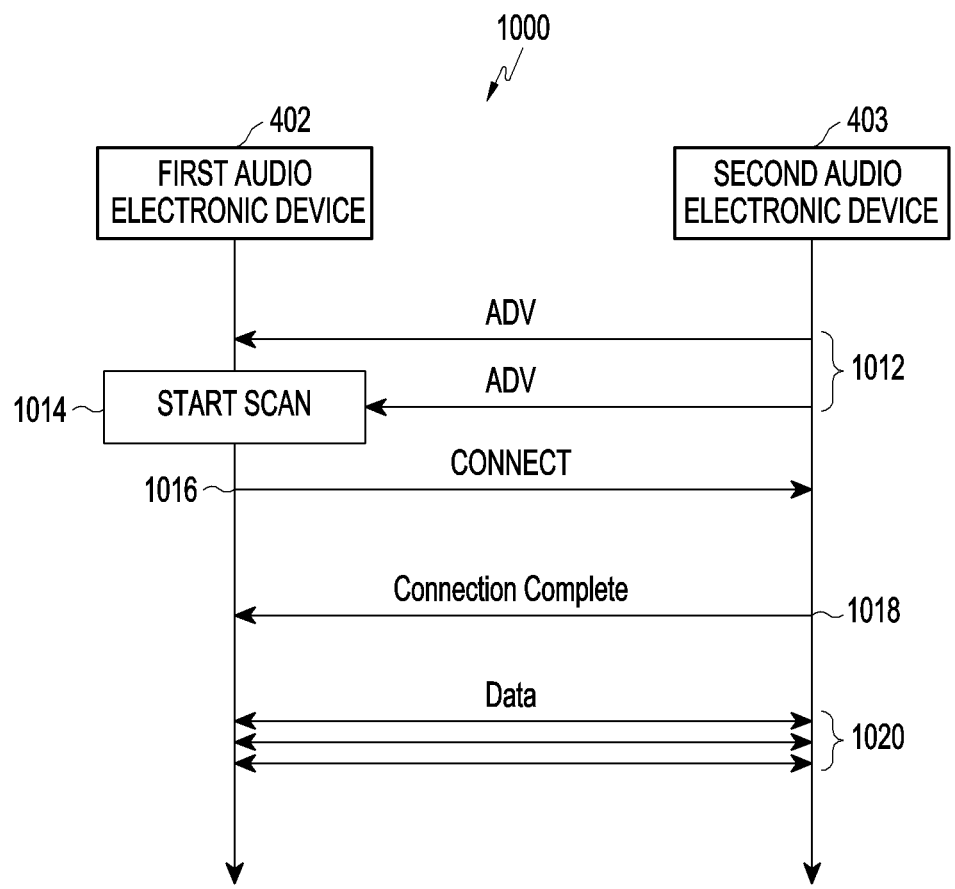
FIG. 10 is a diagram illustrating an operation of performing a second communication connection which is based on a second Bluetooth communication between a first audio electronic device and a second audio electronic device according to an embodiment.

FIG. 10 is a diagram 1000 illustrating an operation of performing a second communication connection which is based on a second Bluetooth communication between a first audio electronic device and a second audio electronic device according to an embodiment.

Referring to FIG. 10, a first audio electronic device 402 (e.g., the electronic device 102 of FIG. 1, the audio electronic device 202 of FIG. 2, or the first audio electronic device 302 of FIG. 3) and a second audio electronic device 403 (e.g., the electronic device 102 of FIG. 1, the audio electronic device 202 of FIG. 2, or the second audio electronic device 303 of FIG. 3) according to an embodiment may perform a second Bluetooth (BLE) communication connection (e.g., the second communication connection 32 of FIG. 3) through an advertising operation and a scan operation.

In operation 1012, the second audio electronic device 403 according to an embodiment may periodically transmit a packet including advertising data.

In operation 1014, the first audio electronic device 402 according to an embodiment may perform a BLE scan to search for an external device. The first audio electronic device 402 may specify an external device (e.g., the second audio electronic device 403) for which a connection will be requested when advertising data which satisfies a condition is received.

In operation 1016, the first audio electronic device 402 according to an embodiment may transmit a connection request to the second audio electronic device 403.

In operation 1018, the second audio electronic device 403 according to an embodiment may transmit a connection complete in response to the connection request to perform a second Bluetooth (BLE) communication connection.

In operation 1020, the first audio electronic device 402 and the second audio electronic device 403 according to an embodiment may transmit and receive data with each other.

Figure 11:
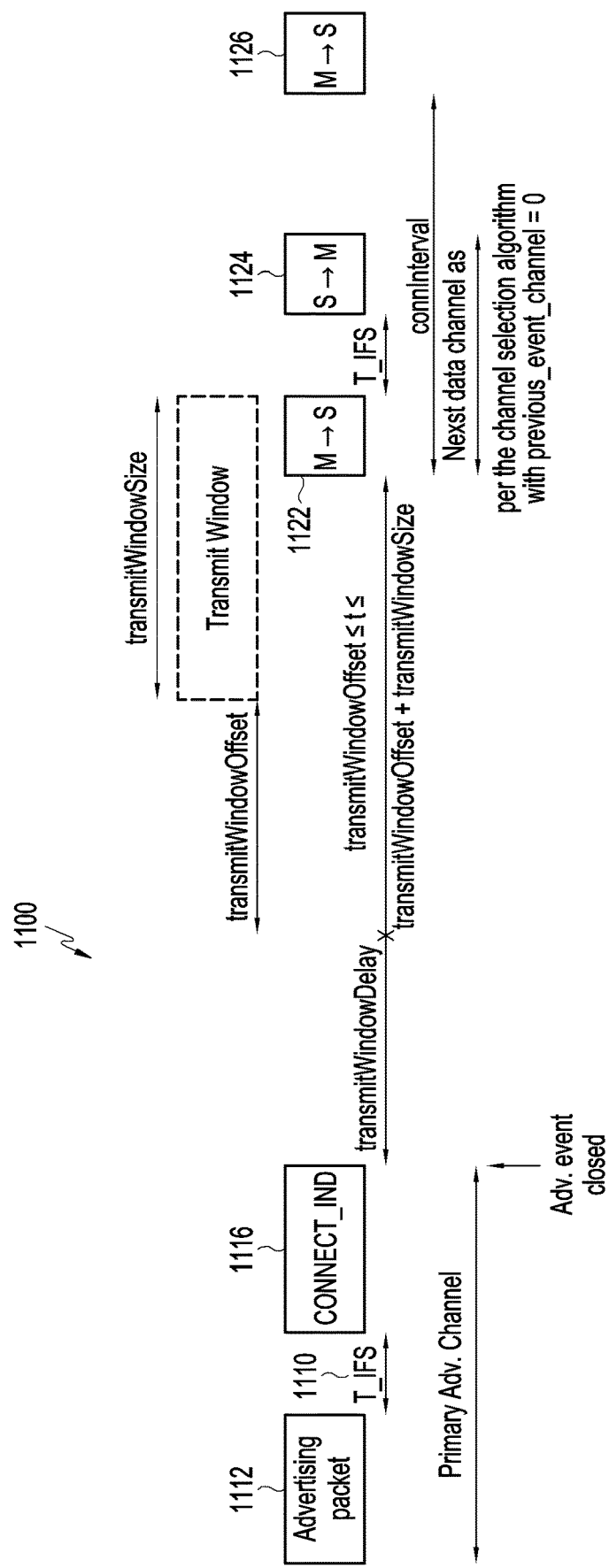
FIG. 11 is a diagram illustrating an example of a packet sequence which is based on a second Bluetooth communication between a first audio electronic device and a second audio electronic device according to an embodiment.

FIG. 11 is a diagram 1100 illustrating an example of a packet sequence which is based on a second Bluetooth communication between a first audio electronic device and a second audio electronic device according to an embodiment.

Referring to FIG. 11, a first audio electronic device 402 (e.g., the electronic device 102 of FIG. 1, the audio electronic device 202 of FIG. 2, or the first audio electronic device 302 of FIG. 3) and a second audio electronic device 403 (e.g., the audio electronic device 202 of FIG. 2 or the second audio electronic device 303 of FIG. 3) according to an embodiment may transmit and receive a packet at predetermined interval 1110 (e.g., T_IFS (an inter frame space or 150 microseconds)). For example, when the second audio electronic device 403 transmits an Advertising Packet 1112, the first audio electronic device 402 may transmit a CONNECT IND packet 1116 for a connection request after the T_IFS 1110. Further, data transmission and reception may be performed in a scheme in which the first audio electronic device 402 transmits first data 1122 after the second Bluetooth (BLE) communication is connected between the first audio electronic device 402 and the second audio electronic device 403, the second audio electronic device 403 transmits second data 1124 after the T_IFS, and the first audio electronic device 402 transmits third data 1126 after the T_IFS.

According to an embodiment, the first audio electronic device 402 may perform, with the electronic device 401, the first communication connection which is based on first Bluetooth communication, and perform, with the second audio electronic device 403, the second communication connection which is based on second Bluetooth communication to provide the second audio electronic device 403 with first communication connection information. The first audio electronic device 402 according to an embodiment may receive audio data or audio signal from the electronic device 401 through the first communication connection to output the audio data or the audio signal, and the second audio electronic device 403 may obtain (e.g., sniff) the audio data or the audio signal from the electronic device 401 based on the first communication connection information to output the audio data or the audio signal.

For example, a first earphone (e.g., the first audio electronic device 402) may receive music data or music signal from a smart phone (e.g., the electronic device 401) through a Bluetooth legacy communication connection to output the music data or the music signal through its speaker, and a second earphone (e.g., the second audio electronic device 403) may sniff the music data or the music signal from the smart phone using communication connection information provided from the first earphone outputting the music data or the music signal through its speaker, thereby audio data or an audio signal of the electronic device 401 may be output at the same time at each of the first audio electronic device 402 and the second audio electronic device 403.

Figure 12A:
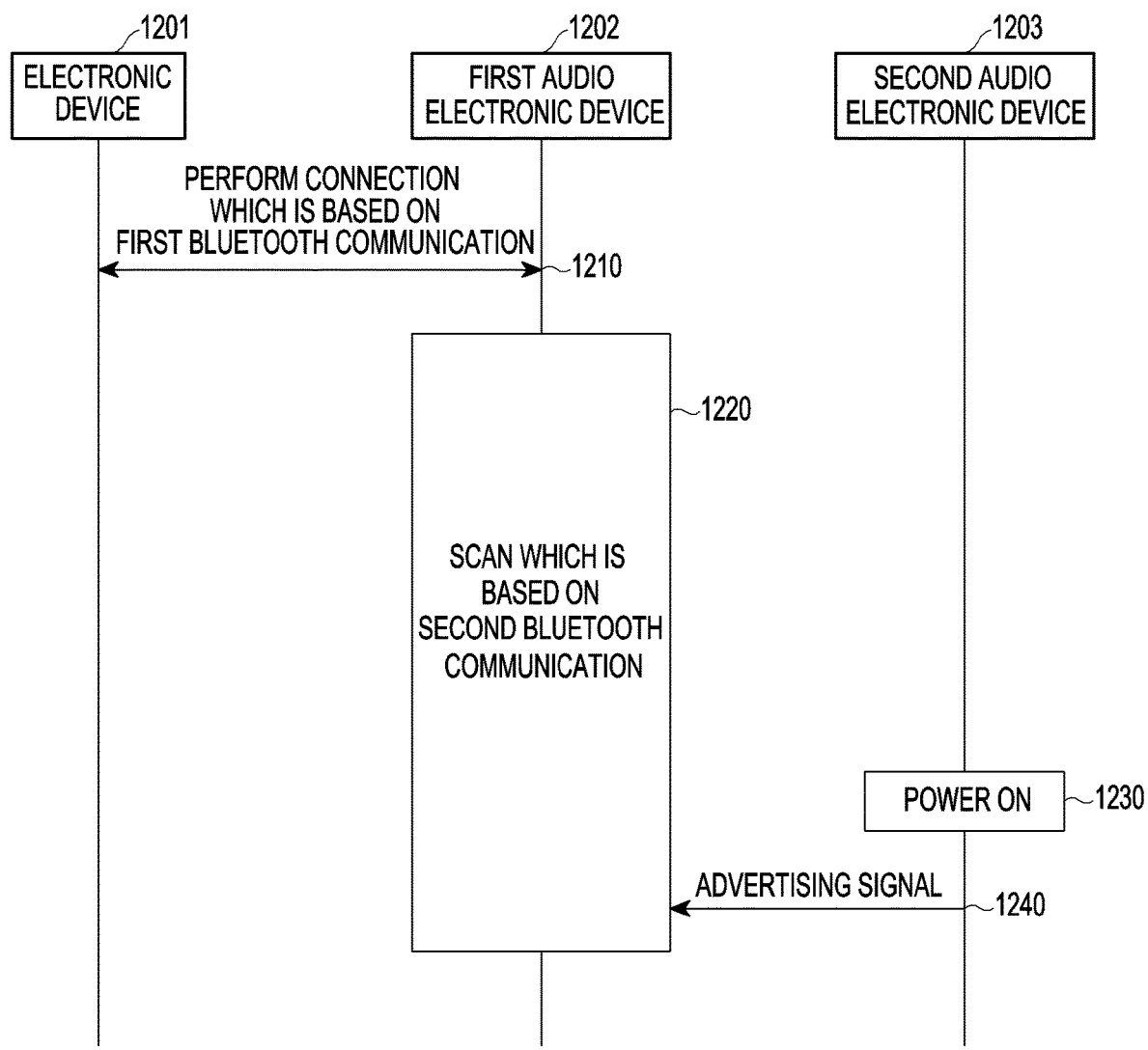
FIGS. 12A and 12B are diagrams for describing a first communication connection between an electronic device and a first audio electronic device, and a second communication connection between the first audio electronic device and a second audio electronic device according to one or more embodiments.
Figure 12B:
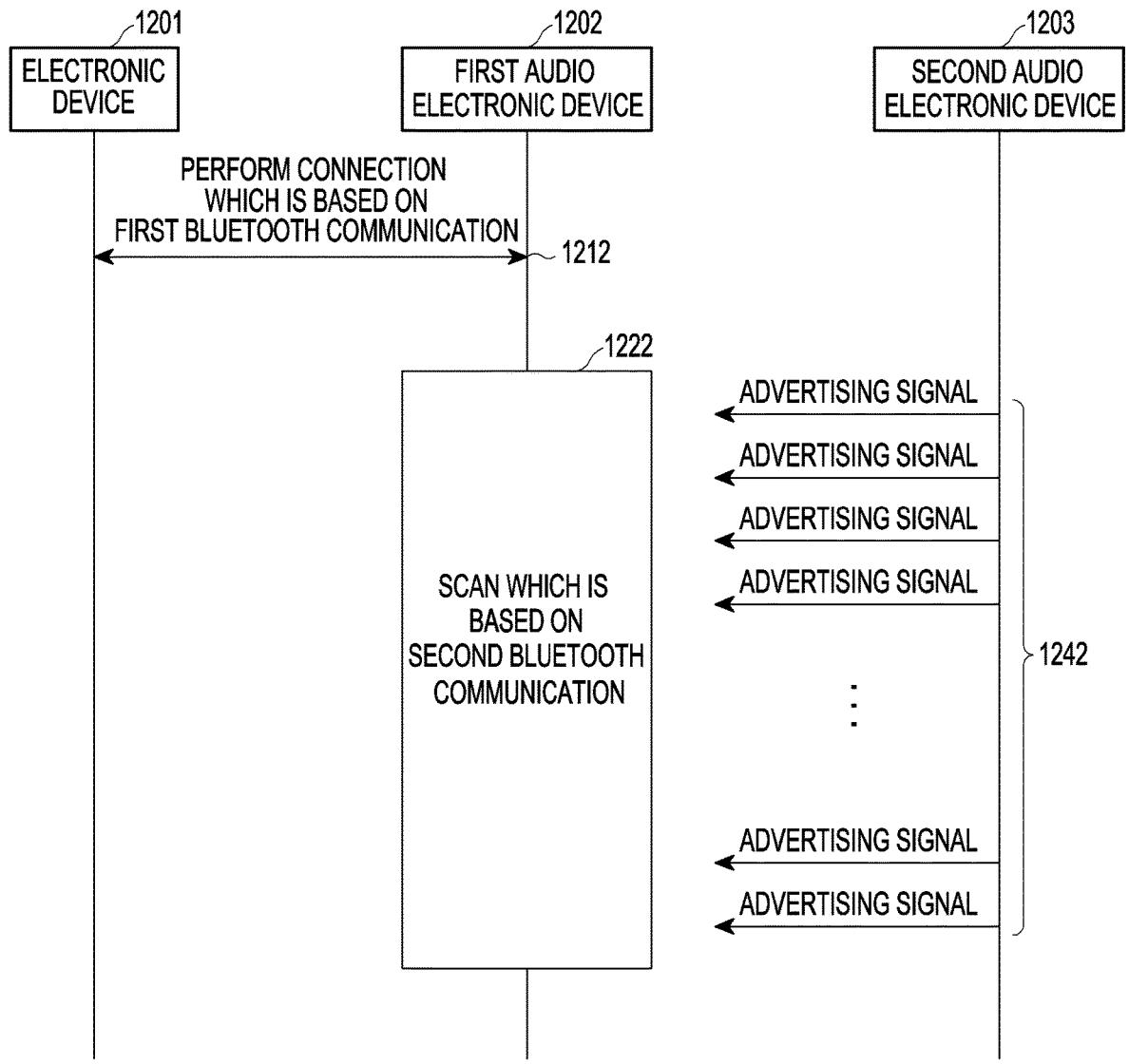

FIGS. 12A and 12B are diagrams for describing a first communication connection between an electronic device and a first audio electronic device, and a second communication connection between the first audio electronic device and a second audio electronic device according to one or more embodiments.

Referring to FIG. 12A, in operation 1210, a first audio electronic device 1202 (e.g., the electronic device 102 of FIG. 1, the audio electronic device 202 of FIG. 2, the first audio electronic device 302 of FIG. 3, or the first audio electronic device 401 of FIG. 4) may perform a connection which is based on first Bluetooth communication with an electronic device 1201 (e.g., the electronic device 101 of FIG. 1, the electronic device 301 of FIG. 3, or the electronic device 401 of FIG. 4). According to an embodiment, the connection which is based on the first Bluetooth communication may be a first communication connection which is based on BR/EDR. According to an embodiment, the first audio electronic device 1202 and a second audio electronic device 1203 are in a state in which Bluetooth (BLE) communication is released due to power off of the second audio electronic device 1203.

In operation 1220, the first audio electronic device 1202 may perform a scan which is based on the second Bluetooth communication in order to establish a second Bluetooth communication connection. According to an embodiment, the scan which is based on the second Bluetooth communication may be a BLE scan. For example, the first audio electronic device 1202 may not search for the second audio electronic device 1203 (e.g., the audio electronic device 202 of FIG. 2, the second audio electronic device 303 of FIG. 3, or the second audio electronic device 403 of FIG. 4) if the second audio electronic device 1203 is powered off during the second communication connection. According to an embodiment, the first audio electronic device 1202 may continuously perform the BLE scan until the second audio electronic device 1203 is powered on and searched.

In operation 1230, the second audio electronic device 1203 may be powered on. For example, when the second audio electronic device 1203 is in the power-off state within a cradle or a case (not shown), and then the second audio electronic device 1203 may be sensed through a sensor to be powered on if the second audio electronic device 1203 is pulled out of the cradle or the case. For example, the second audio electronic device 1203 may be powered on by a power-on button input through an input device (e.g., the input device 220 in FIG. 2).

In operation 1240, as the second audio electronic device 1203 is powered on (or as the second audio electronic device 1203 is powered on and becomes communicable with the first audio electronic device 1202), the second audio electronic device 1203 may transmit, to the first audio electronic device 1202, an advertising signal. The first audio electronic device 1202 may perform a second BLE communication connection with the second audio electronic device 1203 after the advertising signal is received.

According to an embodiment, in the second BLE communication connection, the first audio electronic device 1202 needs to continuously perform the BLE scan until the second audio electronic device 1203 is powered on (or is powered on and becomes communicable with the first audio electronic device 1202), which may waste power. According to an embodiment, the first audio electronic device 1202 may prevent the waste if it is possible for the first audio electronic device 1202 to start the BLE scan for the second audio electronic device 1203 when the second audio electronic device 1203 becomes searchable.

Referring to FIG. 12B, in operation 1212, the first audio electronic device 1202 may perform a connection which is based on a first Bluetooth communication with the electronic device 1201. According to an embodiment, the first Bluetooth communication connection may be based on BR/EDR.

In operation 1222, the first audio electronic device 1202 may perform a scan which is based on the second Bluetooth communication for a second Bluetooth communication connection. According to an embodiment, the scan for the second Bluetooth communication may be a BLE scan. For example, the first audio electronic device 1202 may not search for the second audio electronic device 1203 if there is no external BLE device in its surroundings (or if the strength of a signal of the second audio electronic device 1203 is below a certain threshold). According to an embodiment, the first audio electronic device 1202 may continuously perform the BLE scan until the signal of the second audio electronic device 1203 is received or until reception strength of the signal of the second audio electronic device 1203 increases so that the signal may be searched for.

In operation 1242, the second audio electronic device 1203 may perform advertising which is based on the second Bluetooth communication for the second Bluetooth communication connection. According to an embodiment, the second Bluetooth communication advertising may be BLE advertising. For example, if there is no external BLE device in the first audio electronic device 1202's surroundings (or if the strength of an advertising signal of the second audio electronic device 1203 is below a certain threshold), the second audio electronic device 1203 may not be searched for by the first audio electronic device 1202.

According to an embodiment, in the second BLE communication connection, the first audio electronic device 1202 needs to continuously perform the BLE scan until the signal strength of the second audio electronic device 1203 is strong, so power consumption may increase. Alternatively, the second audio electronic device 1203 needs to continuously perform the BLE advertising until the first audio electronic device 1202 receives an advertising signal, power consumption in the second audio electronic device 1203 may increase. According to an embodiment, the first audio electronic device 1202 may prevent increase in the consumed power of each of the first audio electronic device 1202 and the second audio electronic device 1203 if it is possible for the first audio electronic device 1202 to start the BLE scan when the second audio electronic device 1203 becomes searchable.

Figure 13:
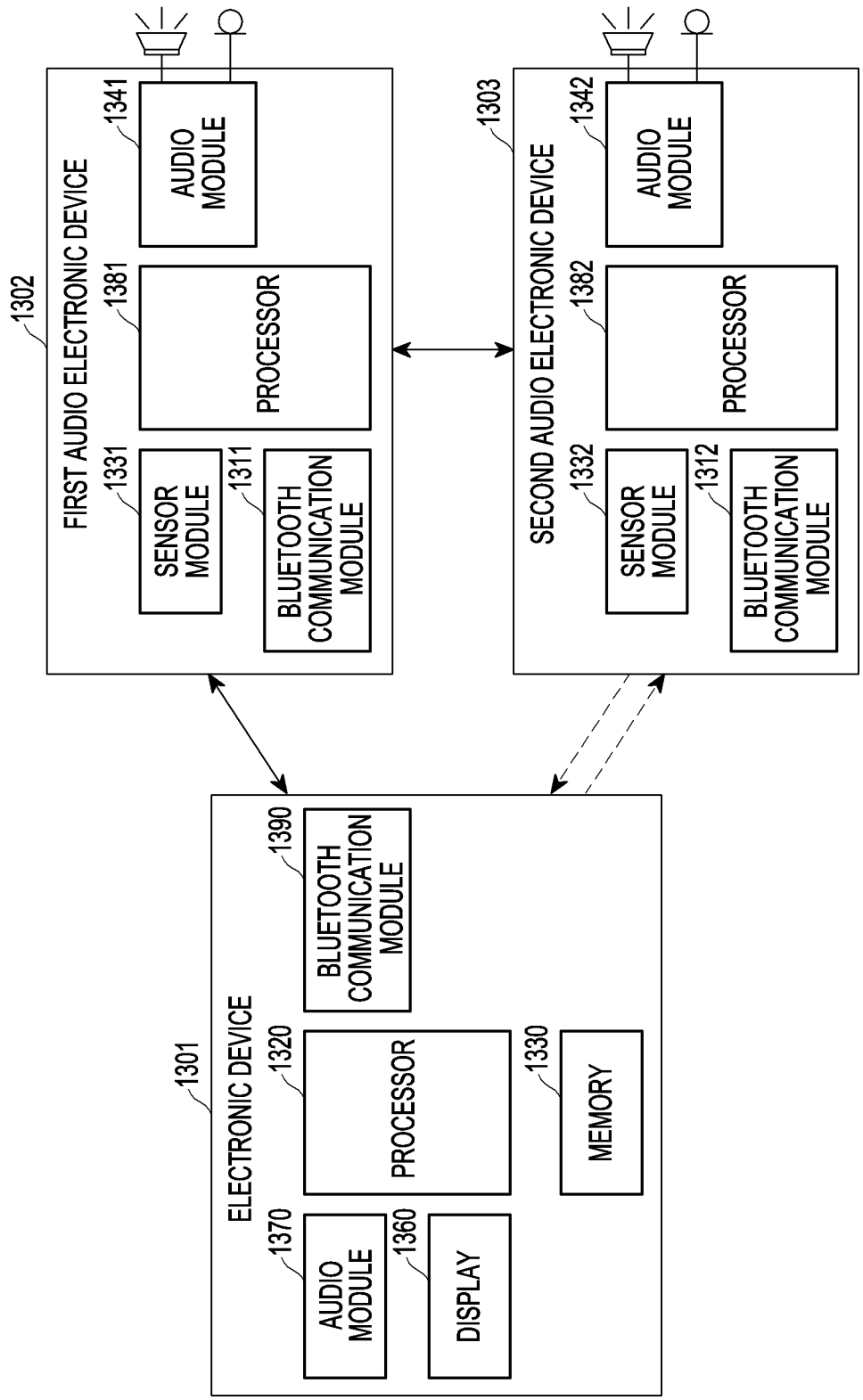
FIG. 13 is a block diagram of an electronic device, a first audio electronic device, and a second audio electronic device according to an embodiment.

FIG. 13 is a block diagram of an electronic device, a first audio electronic device, and a second audio electronic device according to an embodiment.

Referring to FIG. 13, an electronic device 1301 according to an embodiment (e.g., the electronic device 101 of FIG. 1, the electronic device 301 of FIG. 3, the electronic device 401 of FIG. 4, or the electronic device 1201 of FIG. 12) may include a processor 1320, a memory 1330, a display 1360, an audio module 1370, and a Bluetooth communication module 1390.

The processor 1320 according to an embodiment may control the overall operation of the electronic device 1301. The processor 1320 according to an embodiment may perform a first Bluetooth communication connection (e.g., based on BR/BDR) with a first audio electronic device 1302 having a first Bluetooth address through a Bluetooth communication module 1390 (or a Bluetooth communication circuit). The processor 1320 according to an embodiment may identify reception of a second communication connection request (e.g., page request) signal based on the first Bluetooth communication from the second audio electronic device 1303 having the first Bluetooth address while performing the first communication connection. According to an embodiment, the second audio electronic device 1303 may perform a page request to the electronic device 1301 based on an address of the first audio electronic device 1302. When receiving a second communication connection request (e.g., page request) signal which is based on the first Bluetooth communication from the second audio electronic device 1303 while performing the first communication connection, the processor 1320 according to an embodiment may transmit, to the second audio electronic device 1303, a second communication connection response signal including second communication connection request rejection information because the first communication is connected. Herein, second communication connection request rejection information denotes information indicating rejection of the second communication connection request. According to an embodiment, the second audio electronic device 1303 may perform advertising using an address of the second audio electronic device 1303 if rejection of the page request is received from the electronic device 1301. After transmitting the second communication connection response signal, the processor 1320 according to an embodiment may transmit, to the first audio electronic device 1302, information or indication indicating that the second communication connection response signal including the second communication connection request rejection information is transmitted to the second audio electronic device 1303.

The memory 1330 according to an embodiment may be operatively connected to the processor 1320, and may store instructions which cause the processor 1320 to perform the above described operations.

The display 1360 according to an embodiment may display various information related to the transmission of audio contents or audio data to the first audio electronic device 1302 under the control of the processor 1320.

The audio module 1370 according to an embodiment may output the audio contents or sound which corresponds to the audio data by playing back the audio contents or the audio data under the control of the processor 1320.

The Bluetooth communication module 1390 according to an embodiment may perform Bluetooth communication of the Bluetooth legacy scheme or the BLE scheme under the control of the processor 1320.

The first audio electronic device 1302 according to an embodiment (e.g., the electronic device 102 of FIG. 1, the audio electronic device 202 of FIG. 2, the first audio electronic device 302 of FIG. 3, the first audio electronic device 402 of FIG. 4, or the first audio electronic device 1202 of FIG. 12) may include a processor 1381, a sensor module 1331, a Bluetooth communication module 1311, and an audio module 1341.

The processor 1381 according to an embodiment may control the overall operation of the first audio electronic device 1302. The processor 1381 according to an embodiment may perform a first communication connection based on a first Bluetooth communication (e.g., based on BR/BDR) with the electronic device 1301 through the Bluetooth communication module 1311 (or a Bluetooth communication circuit). The processor 1381 may receive, from the electronic device 1301, information or indication indicating that a second communication connection response signal including second communication connection request rejection information is transmitted to the second audio electronic device 1303 while performing the first communication connection. The processor 1381 may identify existence of the second audio electronic device 1303 based on the information indicating that the second communication connection response signal including the second communication connection request rejection information is transmitted to the second audio electronic device 1303. When the existence of the second audio electronic device 1303 is identified, the processor 1381 may transmit a signal (e.g., scan signal or advertising signal) based on a second Bluetooth (BLE) communication for searching for the second audio electronic device 1303 through the Bluetooth communication module 1311. The sensor module 1331 according to an embodiment may measure physical quantity or sense an operating state of the first audio electronic device 1302. The sensor module 1331 may include, for example, at least one of an acceleration sensor, a gyro sensor, a geomagnetic sensor, a magnetic sensor, a proximity sensor, a gesture sensor, a grip sensor, or a biological sensor. According to an embodiment, the sensor module 1331 may sense information or a signal regarding whether the first audio electronic device 1302 is inserted into ears, or information or a signal regarding whether the first audio electronic device 1302 is coupled to an external device (e.g., a charging device). The Bluetooth communication module 1311 according to an embodiment may perform Bluetooth communication which is based on the Bluetooth legacy scheme or the BLE scheme under the control of the processor 1381. The audio module 1341 according to an embodiment may output audio data or an audio signal which is provided from the electronic device 1301 through the first Bluetooth communication through a speaker, and convert an analog voice signal which is input through a microphone into a digital voice signal. According to an embodiment, the audio module 1341 may play back various audio data obtained from various operations of the first audio electronic device 1302.

The second audio electronic device 1303 according to an embodiment (e.g., the electronic device 102 of FIG. 1, the audio electronic device 202 of FIG. 2, the second audio electronic device 303 of FIG. 3, the second audio electronic device 403 of FIG. 4, or the second audio electronic device 1203 of FIG. 12) may include a processor 1382, a sensor module 1332, a Bluetooth communication module 1312, and an audio module 1342.

The processor 1382 according to an embodiment may transmit, to the electronic device 1301, a second communication connection request (e.g., PAGE REQUEST) signal based on the first Bluetooth communication through the Bluetooth communication module 1312 by using a stored first address. The processor 1382 may receive, from the electronic device 1301, a second communication connection request response signal including second communication connection request rejection information because the first Bluetooth communication is connected. Herein, the second communication connection request response signal denotes a response signal to a second communication connection request signal transmitted from the second audio electronic device 1303. When the second communication connection request response signal is received, the processor 1382 may identify existence of the first audio electronic device 1302 and transmit a signal (e.g., scan signal or advertising signal) based on a second Bluetooth (BLE) communication for searching for the first audio electronic device 1302 through the Bluetooth communication module 1312. The sensor module 1332 according to an embodiment may measure physical quantity or sense an operating state of the second audio electronic device 1303. The sensor module 1332 may include, for example, an acceleration sensor, a gyro sensor, a geomagnetic sensor, a magnetic sensor, a proximity sensor, a gesture sensor, a grip sensor, or a biometric sensor. According to one embodiment, the sensor module 1332 may sense information or a signal regarding whether the second audio electronic device 1303 is inserted into ears, or information or a signal regarding whether the second audio electronic device 1303 is coupled to an external device (e.g., a charging device). The Bluetooth communication module 1312 according to an embodiment may perform Bluetooth communication of Bluetooth legacy scheme or BLE scheme under the control of the processor 1382. The audio module 1342 according to an embodiment may sniff audio data or an audio signal which is provided from the electronic device 1301 through the first Bluetooth communication to output the sniffed audio data or audio signal through a speaker, and convert an analog voice signal which is input through a microphone into a digital voice signal. According to an embodiment, the audio module 1342 may play back various audio data obtained from various operations of the second audio electronic device 1303.

According to an embodiment, an electronic device (e.g., the electronic device 101 of FIG. 1, the electronic device 301 of FIG. 3, the electronic device 401 of FIG. 4, the electronic device 1201 of FIG. 12, or the electronic device 1301 of FIG. 13) is provided, and the electronic device includes a Bluetooth communication circuit (e.g., the communication module 190 of FIG. 1, or the Bluetooth communication module 1390), an audio processing circuit (e.g., the audio module 170 of FIG. 1, or the audio module 1370 of FIG. 13), a memory (e.g., the memory 130 of FIG. 1, or the memory 1330 of FIG. 13), and at least one processor (e.g., the processor 120 of FIG. 1, or the processor 1320 of FIG. 13) which is operatively connected with the Bluetooth communication circuit, the audio processing circuit, and the memory, and the at least one processor is configured to: perform a first communication connection based on a first Bluetooth communication with a first audio electronic device having a first Bluetooth address using the Bluetooth communication circuit, receive, from a second audio electronic device having the first Bluetooth address, a second communication connection request based on the first Bluetooth communication while performing the first communication connection, transmit, to the second audio electronic device, a second communication connection request response signal including rejection information for the received second communication connection request using the Bluetooth communication circuit due to the first communication connection, and transmit, to the first audio electronic device, a message related to the rejection information for the second communication connection request through the first communication connection.

According to an embodiment, the first Bluetooth communication may be BR/EDR.

According to an embodiment, the second communication connection request based on the first Bluetooth communication may be a page request that is based on Bluetooth legacy, and the second communication connection request response signal may be a page response based on the Bluetooth legacy.

According to an embodiment, the message related to the rejection information may include indication indicating that the electronic device transmitted, to the second audio electronic device, the second communication connection request response signal.

According to an embodiment, the message related to the rejection information may include a serial port profile (SPP) message.

According to an embodiment, an audio electronic device (e.g., the electronic device 102 of FIG. 1, the audio electronic device 202 of FIG. 2, the first audio electronic device 302 of FIG. 3, the first audio electronic device 402 of FIG. 4, the first audio electronic device 1202 of FIG. 12, or the first audio electronic device 1302 of FIG. 13) is provided, and the audio electronic device includes a Bluetooth communication circuit (e.g., the communication circuit 210 of FIG. 2, or the Bluetooth communication module 1391 of FIG. 13), an audio processing circuit (e.g., the audio processing circuit 240 of FIG. 2, or the audio module 1371 of FIG. 13), a memory (e.g., the memory 250 of FIG. 2, or the memory 1330 of FIG. 13), and at least one processor (e.g., the processor 280 of FIG. 2, or the processor 1321 of FIG. 13) which is operatively connected with the Bluetooth communication circuit, the audio processing circuit, and the memory, and the at least one processor is configured to: perform a first communication connection based on a first Bluetooth communication by using a first Bluetooth address with an external electronic device through the Bluetooth communication circuit, and perform a scan or an advertising for a second communication connection based on a second Bluetooth communication with an external audio electronic device having the first Bluetooth address through the Bluetooth communication circuit after identifying existence of the external audio electronic device while performing the first communication connection.

According to an embodiment, the first Bluetooth communication may be BR/EDR, and the second Bluetooth communication may be BLE communication.

According to an embodiment, the at least one processor may be configured to identify the existence of the external audio electronic device based on reception, from the electronic device, of information related to a second communication connection request rejection while performing the first communication connection, where the second communication connection request rejection may be generated in response to a communication request based on the first Bluetooth communication transmitted from the external audio electronic device to the external electronic device.

According to an embodiment, the at least one processor may be configured to identify the existence of the external audio electronic device based on a second communication connection request rejection response signal that is transmitted from the external electronic device to the external audio electronic device, where the second communication connection request rejection response signal may be generated in response to a communication request based on the first Bluetooth communication and the first address transmitted from the external audio electronic device to the external electronic device.

According to an embodiment, the at least one processor may be configured to transmit, to the external audio electronic device, information related to the first communication connection when the second communication connection is performed with the external audio electronic device.

According to an embodiment, an audio electronic device (e.g., the electronic device 102 of FIG. 1, the audio electronic device 202 of FIG. 2, the second audio electronic device 303 of FIG. 3, the second audio electronic device 403 of FIG. 4, the second audio electronic device 1203 of FIG. 12, or a second audio electronic device 1304 of FIG. 13) is provided, and the audio electronic device includes a Bluetooth communication circuit (e.g., the communication circuit 210 of FIG. 2, or the Bluetooth communication module 1392 of FIG. 13), an audio processing circuit (e.g., the audio processing circuit 240 of FIG. 2, or the audio module 1372 of FIG. 13), a memory (e.g., the memory 250 of FIG. 2, or the memory 1330 of FIG. 13), and at least one processor (e.g., the processor 280 of FIG. 2, or the processor 1382 of FIG. 13) which is operatively connected with the Bluetooth communication circuit, the audio processing circuit, and the memory, and the at least one processor may be configured to: transmit, to an external electronic device, a communication connection request signal based on a first Bluetooth communication and a first address stored in the memory, receive, from the external electronic device through the Bluetooth communication circuit, a communication connection request response signal including rejection information for a communication connection request using the first address due to a first communication connection using the first address already being established, identify existence of an external audio electronic device based on the communication connection request response signal, and perform a scan or an advertising to establish a second communication connection based on a second Bluetooth communication with the external audio electronic device through the Bluetooth communication circuit.

According to an embodiment, the communication connection request signal may be a page request based on Bluetooth legacy, and the communication connection request response signal may be a page response based on the Bluetooth legacy.

According to an embodiment, the at least one processor may be configured to receive, from the external audio electronic device, information related to the first communication connection when the second communication connection is established with the external audio electronic device, and to obtain data transmitted from the external electronic device using the information related to the first communication connection which is based on the first Bluetooth communication.

Figure 14:
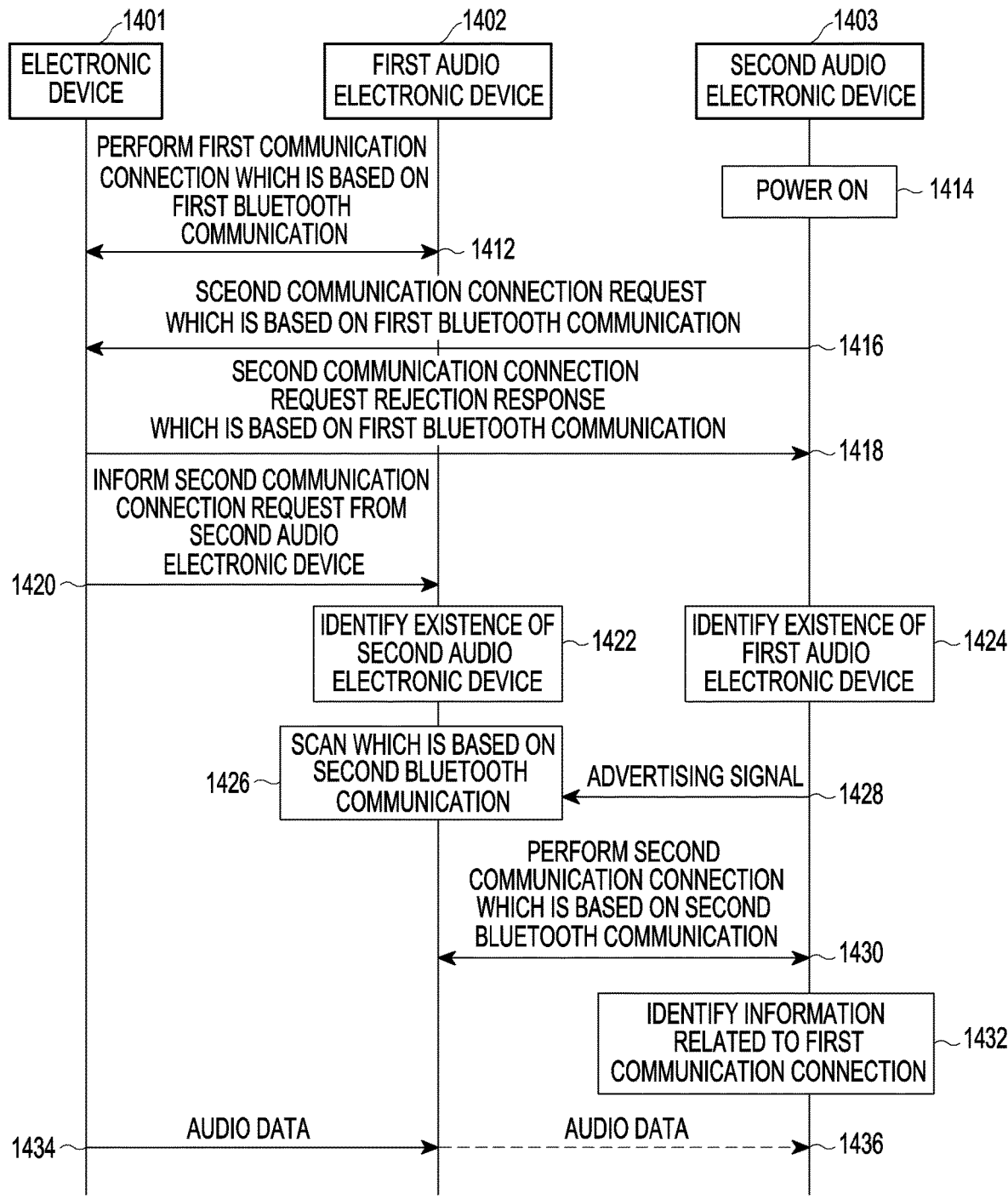
FIG. 14 is a flowchart illustrating an operation of an electronic device, a first audio electronic device, and a second audio electronic device according to an embodiment.

FIG. 14 is a flowchart illustrating an operation of an electronic device, a first audio electronic device, and a second audio electronic device according to an embodiment.

Referring to FIG. 14, in operation 1412, an electronic device 1401 according to an embodiment (e.g., the electronic device 101 of FIG. 1, the electronic device 301 of FIG. 3, the electronic device 401 of FIG. 4, the electronic device 1201 of FIG. 12 or an electronic device 1301 of FIG. 13) may perform a first communication connection based on a first Bluetooth communication with a first audio electronic device 1402 (e.g., the electronic device 102 of FIG. 1, the audio electronic device 202 of FIG. 2, the first audio electronic device 302 of FIG. 3, the first audio electronic device 402 of FIG. 4, the first audio electronic device 1202 of FIG. 12, or the first audio electronic device 1302 of FIG. 13). For example, the electronic device 1401 may perform a first communication connection based on BR/EDR using a first Bluetooth address of the first audio electronic device 1402. According to an embodiment, after performing the first communication connection based on the first Bluetooth communication, the first audio electronic device 1402 may not perform a scan operation or an advertising operation for searching for a second audio electronic device 1403 until existence of the second audio electronic device 1403 is identified. According to an embodiment, the first audio electronic device 1402 and the second audio electronic device 1403 may be paired, and may store address or/and attribute of each other. For example, each of the first audio electronic device 1402 and the second audio electronic device 1403 may store address or/and attribute of each other in their respective memories during manufacture. In another example, the first audio electronic device 1402 and the second audio electronic device 1403 may perform a second Bluetooth communication connection, and receive address or/and attribute of each other to store the address or/and attribute of each other in memory.

In operation 1414, the second audio electronic device 1403 according to an embodiment (e.g., the electronic device 102 of FIG. 1, the audio electronic device 202 of FIG. 2, the second audio electronic device 303 of FIG. 3, the second audio electronic device 403 of FIG. 4, the second audio electronic device 1203 of FIG. 12, or the second audio electronic device 1304 of FIG. 13) may be powered on. For example, when the second audio electronic device 1403 is in a power-off state in a cradle or a case (not shown), the second audio electronic device 1203 may be sensed through a sensor module to be powered on if the second audio electronic device 1403 is pulled out of the cradle or the case. In another example, the second audio electronic device 1403 may be powered on by a power-on button input through an input device (e.g., the input device 220 of FIG. 2).

In operation 1416, when being powered on, the second audio electronic device 1403 may perform a second communication connection request based on the first Bluetooth communication to the electronic device 1401 using previously stored information. For example, the second audio electronic device 1403 may transmit a page request signal which is based on Bluetooth legacy using a pre-stored first Bluetooth address (the same address as the first audio electronic device 1402). If a second communication connection request of the second audio electronic device 1403 using the first Bluetooth address is received while the electronic device 1401 performs the first communication connection which uses the first Bluetooth address with the first audio electronic device 1402, another communication connection for the same address is impossible, so the electronic device 1401 may reject the second communication connection request.

In operation 1418, the electronic device 1401 according to an embodiment may send a second communication connection request rejection response based on the first Bluetooth communication because the first communication is already connected by using the first Bluetooth address. Herein, the second communication connection request rejection response denotes a rejection response to the second communication connection request. According to an embodiment, the electronic device 1401 may transmit a page response signal based on Bluetooth legacy that includes information indicating the second communication connection rejection. According to an embodiment, the electronic device 1401 may transmit the page response signal based on Bluetooth legacy that includes information indicating the second communication connection rejection and information indicating a reason for the second communication connection rejection (e.g., ACL Connection Already Exists).

In operation 1420, the electronic device 1401 according to an embodiment may transmit, to the first audio electronic device 1402 with which the electronic device 1401 performs the first communication connection, information or indication indicating that there has been a second communication connection request which uses the first Bluetooth address or that the electronic device 1401 has transmitted the second communication connection request rejection response.

In operation 1422, the first audio electronic device 1402 according to an embodiment may identify existence of the second audio electronic device 1403. According to an embodiment, the first audio electronic device 1402 may identify that the second audio electronic device 1403 exists around the electronic device 1401 based on the information or indication indicating that there was the second communication request which uses the first Bluetooth address or that the electronic device 1401 has transmitted the second communication connection request rejection response. According to another embodiment, the first audio electronic device 1402 may identify the existence of the second audio electronic device 1403 by identifying the second communication connection request rejection response which is based on the first Bluetooth address and which is transmitted from the electronic device 1401.

In operation 1424, the second audio electronic device 1403 according to an embodiment may identify existence of the first audio electronic device 1402. For example, when receiving, from the electronic device 1401, the second communication connection request rejection response based on the first Bluetooth address, the second audio electronic device 1403 may identify that the first audio electronic device 1402 exists around the electronic device 1401.

In operation 1426, the first audio electronic device 1402 according to an embodiment, after identifying the existence of the second audio electronic device 1403, may perform a scan (or advertising) operation based on a second Bluetooth (BLE) communication.

In operation 1428, the second audio electronic device 1403 according to an embodiment may perform an advertising (or scan) operation based on the second Bluetooth (BLE) communication when the existence of the first audio electronic device 1402 is identified. According to an embodiment, the second audio electronic device 1403 may perform an advertising (or scan) operation using an address of the second audio electronic device 303 when the existence of the first audio electronic device 1402 is identified.

In operation 1430, the first audio electronic device 1402 and the second audio electronic device 1403 according to an embodiment may perform a second communication connection based on the second Bluetooth communication.

In operation 1432, the second audio electronic device 1403 according to an embodiment may identify information related to the first communication connection based on the first Bluetooth communication.

According to an embodiment, the second audio electronic device 1403 may identify the information related to the first Bluetooth communication connection by receiving the information related to the first Bluetooth communication connection between the electronic device 1401 and the first audio electronic device 1402 through the second Bluetooth communication connection with the first audio electronic device 1402, or may identify the information related to the first communication connection which is previously stored (e.g., the information related to the first communication connection is previously shared between the electronic device 1401 and the first audio electronic device 1402 through a previous communication connection or a previous pairing operation). According to an embodiment, the information related to the first communication connection between the electronic device 1401 and the first audio electronic device 1402 may include device information of the electronic device 401, device information of the first audio electronic device 1402, and the address of the first audio electronic device 1402 (e.g., the address used by the first audio electronic device 402 for the first communication connection with the electronic device 401). For example, the information related to the first communication connection may include at least one of address information (e.g., at least one of Bluetooth address or LT address), clock information (e.g., at least one of Bluetooth piconet clock or Master's clock native (CLKN)), channel information (e.g., used channel map), service discovery protocol (SDP) result information, information about a supported function (e.g., supported feature), key information (e.g., Bluetooth link key), or extended inquiry response (EIR) packet. For example, the information related to the first Bluetooth communication connection may include information for the second audio electronic device 1403 to obtain (e.g., sniff) audio data or an audio signal from the electronic device 1401.

In operation 1434, the first audio electronic device 1402 according to an embodiment may receive audio data (or audio signal) from the electronic device 1401 through the first Bluetooth communication connection and output the received audio data (or audio signal).

In operation 1436, the second audio electronic device 1403 according to an embodiment may obtain (e.g., sniff) audio data (or audio signal) transmitted from the electronic device 1401 using the information related to the first Bluetooth communication connection, and output the obtained audio data (or audio signal). For example, the second audio electronic device 1403 may obtain (e.g., sniff) the audio data (or audio signal) transmitted from the electronic device 1401 using at least one of address information (e.g., at least one of a Bluetooth address or an LT address) related to the first communication connection, clock information (e.g., at least one of Bluetooth piconet clock or Master's clock native (CLKN)) related to the first communication connection, channel information (e.g., used channel map) related to the first communication connection, service discovery protocol (SDP) result information related to the first communication connection, information about a supported function (e.g., supported feature) related to the first communication connection, key information (e.g., Bluetooth link key) related to the first communication connection, or an extended inquiry response (EIR) packet related to the first communication connection, and output the obtained audio data (or audio signal).

According to an embodiment, a method for a communication connection based on low energy in an electronic device (e.g., the electronic device 101 of FIG. 1, the electronic device 301 of FIG. 3, the electronic device 401 of FIG. 4, the electronic device 1201 of FIG. 12, the electronic device 1301 of FIG. 13, or the electronic device 1301 of FIG. 13) is provided, and the method may include performing a first communication connection based on a first Bluetooth communication with a first audio electronic device (e.g., the electronic device 102 of FIG. 1, the audio electronic device 202 of FIG. 2, the first audio electronic device 302 of FIG. 3, the first audio electronic device 402 of FIG. 4, the first audio electronic device 1202 of FIG. 12, the first audio electronic device 1302 of FIG. 13, or the first audio electronic device 1402 of FIG. 14) having a first Bluetooth address using a Bluetooth communication circuit, receiving, from a second audio electronic device (e.g., the electronic device 102 of FIG. 1, the audio electronic device 202 of FIG. 2, the second audio electronic device 303 of FIG. 3, the second audio electronic device 403 of FIG. 4, the second audio electronic device 1203 of FIG. 12, the second audio electronic device 1303 of FIG. 13, or the second audio electronic device 1403 of FIG. 14) having the first Bluetooth address, a second communication connection request based on the first Bluetooth communication while performing the first communication connection, transmitting, to the second audio electronic device, a second communication connection request response signal including rejection information for the received second communication connection request using the Bluetooth communication circuit due to the first communication connection, and transmitting, to the first audio electronic device, a message related to the rejection information for the second communication connection request through the first communication connection.

According to an embodiment, the first Bluetooth communication may be BR/EDR.

According to an embodiment, the second communication connection request based on the first Bluetooth communication may be a page request that is based on Bluetooth legacy, and the second communication connection request response signal may be a page response based on Bluetooth legacy.

According to an embodiment, the message related to the rejection information may include indication indicating that the electronic device transmitted, to the second audio electronic device, the second communication connection request response signal.

According to an embodiment, the first audio electronic device 1402 and the second audio electronic device 1403 may perform a second communication connection based on a second Bluetooth communication before or after the first audio electronic device 1402 performs a first communication connection based on a first Bluetooth communication with the electronic device 1401 (e.g., operation 1412). The second audio electronic device 1403 may receive, from the first audio electronic device 1402, information about the first communication connection through the second communication connection, and obtain (or sniffing) audio data or audio signal exchanged between the electronic device 1401 and the first audio electronic device 1402 through the first communication connection. The second audio electronic device 1403 may be powered off or may leave the network with the first audio electronic device 1402 (or the second communication connection is released). If the second communication connection is released, for performing the second communication connection again, the second audio electronic device 1403 may request, from the electronic device 1401, the first communication connection based on the first Bluetooth communication and an address (e.g., a first Bluetooth address) of the first audio electronic device 1402 as described in operation 1416 without performing a scan operation (e.g., the operation 1220 of FIG. 12A or the operation 1222 of FIG. 12B) or an operation of transmitting an advertising signal (e.g., the operation 1240 of FIG. 12A or the operation 1242 of FIG. 12B) for the second communication connection with the first audio electronic device 1402. Thereafter, operations 1418 to 1432 may be performed, and audio data or audio signal transmitted and received by the electronic device 1401 and the first audio electronic device through the first communication connection may be obtained (or sniffed) by the second audio electronic device 1403.

Figure 15:
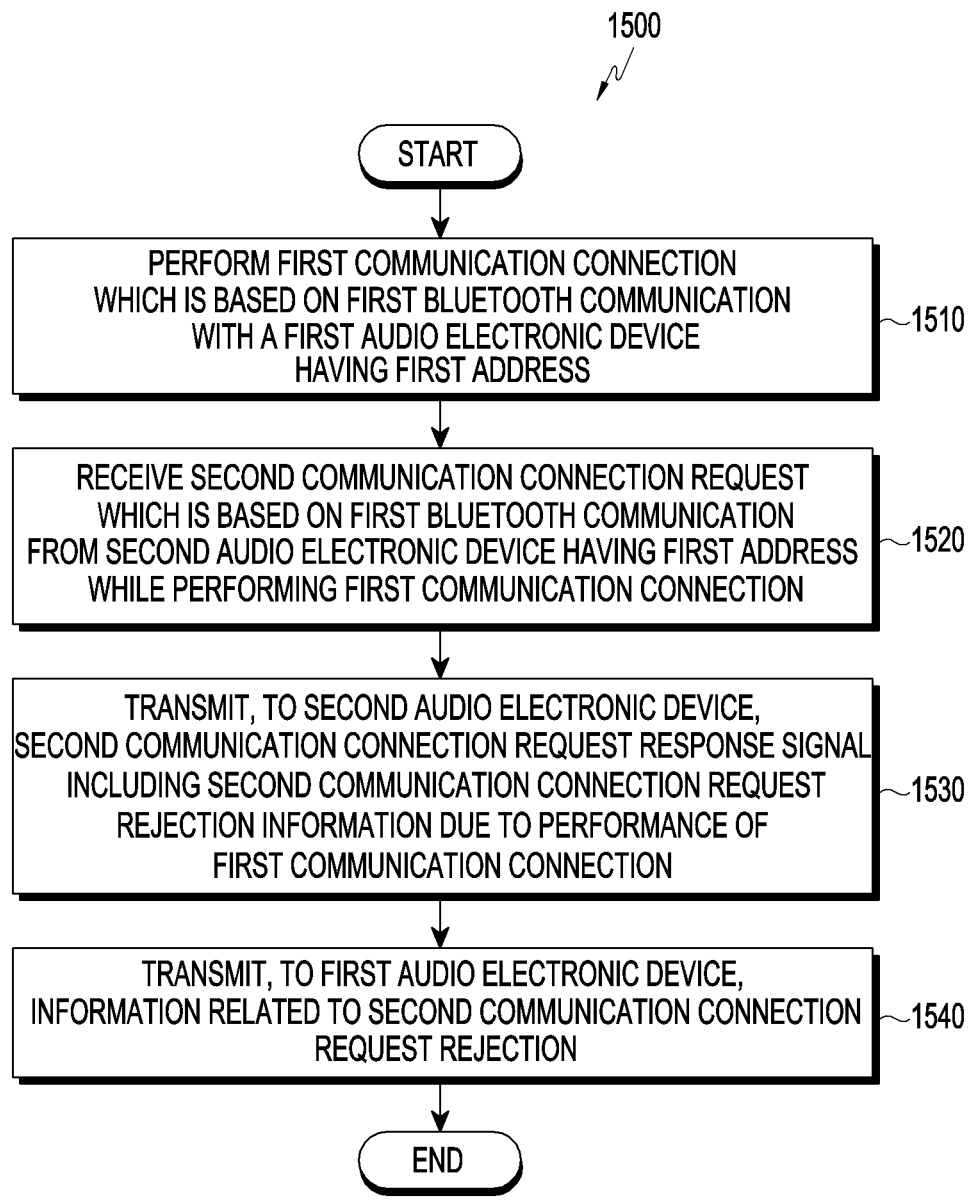
FIG. 15 is a flowchart illustrating an operation of an electronic device according to an embodiment.

FIG. 15 is a flowchart 1500 illustrating an operation of an electronic device according to an embodiment.

Referring to FIG. 15, operations 1510 to 1540 according to an embodiment may be understood as operations performed by a processor (e.g., the processor 120 of FIG. 1, or the processor 1320 of FIG. 13) of an electronic device 1401 (e.g., the electronic device 101 of FIG. 1, the electronic device 301 of FIG. 3, the electronic device 401 of FIG. 4, an electronic device 1201 of FIG. 12, or the electronic device 1301 of FIG. 13). According to an embodiment, at least one of the operations 1510 to 1540 may be omitted, an order of some operations among the operations 1510 to 1540 may be changed, or another operation may be added.

In operation 1510, the electronic device 1401 may perform, with a first audio electronic device 1402, a first communication connection based on a first Bluetooth communication. For example, the electronic device 1401 may perform the first communication connection based on BR/EDR using the first Bluetooth address of the first audio electronic device 1402.

In operation 1520, the electronic device 1401 may receive, from a second audio electronic device 1403, a second communication connection request based on the first Bluetooth communication and the first Bluetooth address. For example, the electronic device 1401 may receive, from the second audio electronic device 1403, a page request signal which is based on Bluetooth legacy and the first Bluetooth address, and the first Bluetooth address is the same address as the first audio electronic device 1402.

In operation 1530, the electronic device 1401 may transmit, to the second audio electronic device 1403, a second communication connection request response signal which is based on the first Bluetooth communication and includes second communication connection request rejection information based on the first communication being connected using the first Bluetooth address. For example, the electronic device 1401 may transmit a page response signal based on Bluetooth legacy that includes the second communication connection request rejection information.

In operation 1540, the electronic device 1401 may transmit information related to second communication connection request rejection to the first audio electronic device 1402 through the first communication connection. For example, the electronic device 1401 may transmit, to the first audio electronic device 1402 connected via the first communication connection, information or indication indicating that there is the second communication connection request which uses the first Bluetooth address or that the second communication connection request rejection response was transmitted. According to an embodiment, the information related to the second communication connection request rejection may be in the form of a serial port profile (SPP) message. According to an embodiment, the first audio electronic device 1402 may identify existence of the second audio electronic device 1403 based on the information related to the second communication connection request rejection.

Figure 16:
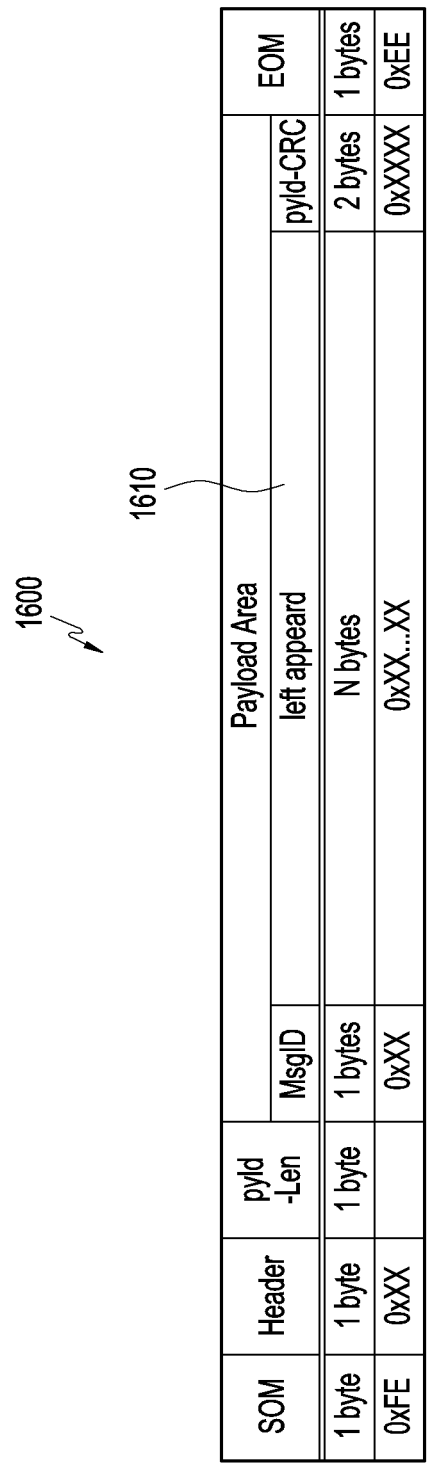
FIG. 16 is a diagram illustrating an example of a serial port profile (SPP) message format according to an embodiment.

FIG. 16 is a diagram illustrating an example of a serial port profile (SPP) message format according to an embodiment.

Referring to FIG. 16, an electronic device 1401 (e.g., the electronic device 101 of FIG. 1, the electronic device 301 of FIG. 3, the electronic device 401 of FIG. 4, the electronic device 1201 of FIG. 12, or the electronic device 1301 of FIG. 13) may generate an SPP message 1600 indicating existence (or appearance) (e.g., "Left Appeared") of a second audio electronic device based on information related to a second communication connection request rejection.

The SPP message 1600 according to an embodiment may include information such as "Left Appeared" indicating, for example, the existence (or appearance) of the second audio electronic device into a msgID field. When the SPP message 1600 is received, the first audio electronic device 1401 may identify the existence (or appearance) of the second audio electronic device based on information such as "Left Appeared" 1610. According to another embodiment, the SPP message 1600 may further include information that causes the first audio electronic device 1401 to start a scan (or advertising) operation.

Figure 17:
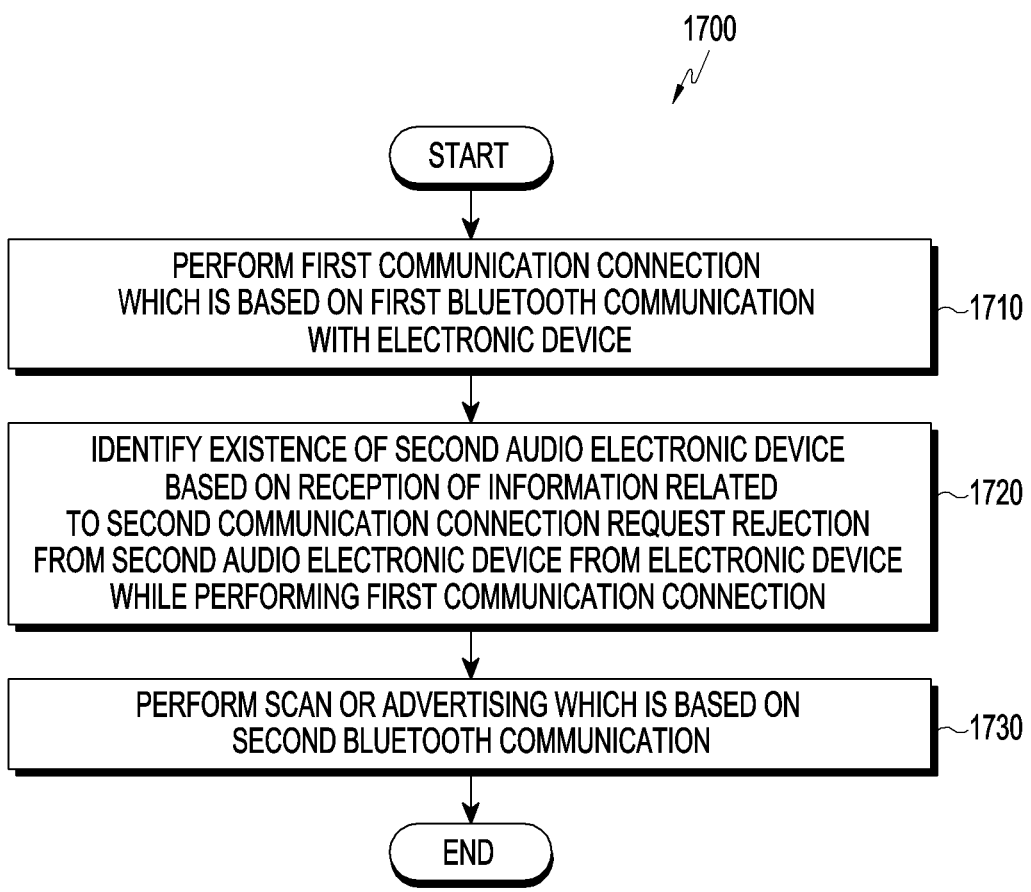
FIG. 17 is a flowchart illustrating an operation of a first audio electronic device according to an embodiment.

FIG. 17 is a flowchart 1700 illustrating an operation of a first audio electronic device according to an embodiment.

Referring to FIG. 17, operations 1710 to 1730 according to an embodiment may be understood as operations performed by a processor (e.g., the processor 1381 of FIG. 13) of a first audio electronic device 1402 (e.g., the electronic device 102 of FIG. 1, the audio electronic device 202 of FIG. 2, the first audio electronic device 302 of FIG. 3, the first audio electronic device 402 of FIG. 4, the first audio electronic device 1202 of FIG. 12, or the first audio electronic device 1302 of FIG. 13). According to an embodiment, at least one of the operations 1710 to 1730 may be omitted, an order of some operations among the operations 1710 to 1730 may be changed, or another operation may be added.

In operation 1710, the first audio electronic device 1402 may perform, with the electronic device 1401, a first communication connection based on a first Bluetooth communication. For example, the first audio electronic device 1402 may perform the first communication connection based on BR/EDR with the electronic device 1401 using the first Bluetooth address of the first audio electronic device 1402. According to an embodiment, the first audio electronic device 1402 may not perform a scan operation or an advertising operation for searching for a second audio electronic device 1403 until existence of the second audio electronic device 1403 is identified after performing the first Bluetooth communication connection.

In operation 1720, while performing the first communication connection, the first audio electronic device 1402 may identify the existence of the second audio electronic device 1403 based on information related to rejection for a second communication connection request from the second audio electronic device 1403 which is received from the electronic device 1401. For example, while performing the first communication connection, the first audio electronic device 1402 may receive, from the electronic device 1401, information or indication indicating that there was the second communication connection request which uses the first Bluetooth address or that a second communication connection request rejection response based on the first Bluetooth address was transmitted. According to an embodiment, the information related to the rejection for the second communication connection request may be in the form of an SPP message. According to another embodiment, the first audio electronic device 1402 may identify the existence of the second audio electronic device 1403 by identifying the second communication connection rejection response (e.g., a page response), which is based on the first Bluetooth communication transmitted from the electronic device 1401.

In operation 1730, the first audio electronic device 1402 may perform a scan operation or an advertising operation for searching for the second audio electronic device 1403 based on a second Bluetooth (BLE) communication after the existence of the second audio electronic device 1403 is identified.

According to an embodiment, a method for a communication connection based on low energy in an audio electronic device (e.g., the electronic device 102 of FIG. 1, the audio electronic device 202 of FIG. 2, the first audio electronic device 302 of FIG. 3, the first audio electronic device 402 of FIG. 4, the first audio electronic device 1202 of FIG. 12, the first audio electronic device 1302 of FIG. 13, or the first audio electronic device 1402 of FIG. 14) is provided, and the method may include performing a first communication connection based on a first Bluetooth communication by using a first Bluetooth address with an external electronic device (e.g., the electronic device 101 of FIG. 1, the electronic device 301 of FIG. 3, the electronic device 401 of FIG. 4, the electronic device 1201 of FIG. 12, the electronic device 1301 of FIG. 13, or the electronic device 1401 of FIG. 14) using a Bluetooth communication circuit, identifying existence of an external audio electronic device (e.g., the electronic device 102 of FIG. 1, the audio electronic device 202 of FIG. 2, the second audio electronic device 303 of FIG. 3, the second audio electronic device 403 of FIG. 4, the second audio electronic device 1203 of FIG. 12, the second audio electronic device 1303 of FIG. 13, or the second audio electronic device 1403 of FIG. 14) having the first Bluetooth address while performing the first communication connection, and performing a scan or an advertising for a second communication connection based on a second Bluetooth communication with the external audio electronic device using the Bluetooth communication circuit in case that the existence of the external audio electronic device is identified.

According to an embodiment, the first Bluetooth communication may be BR/EDR, and the second Bluetooth communication may be BLE communication.

Figure 18:
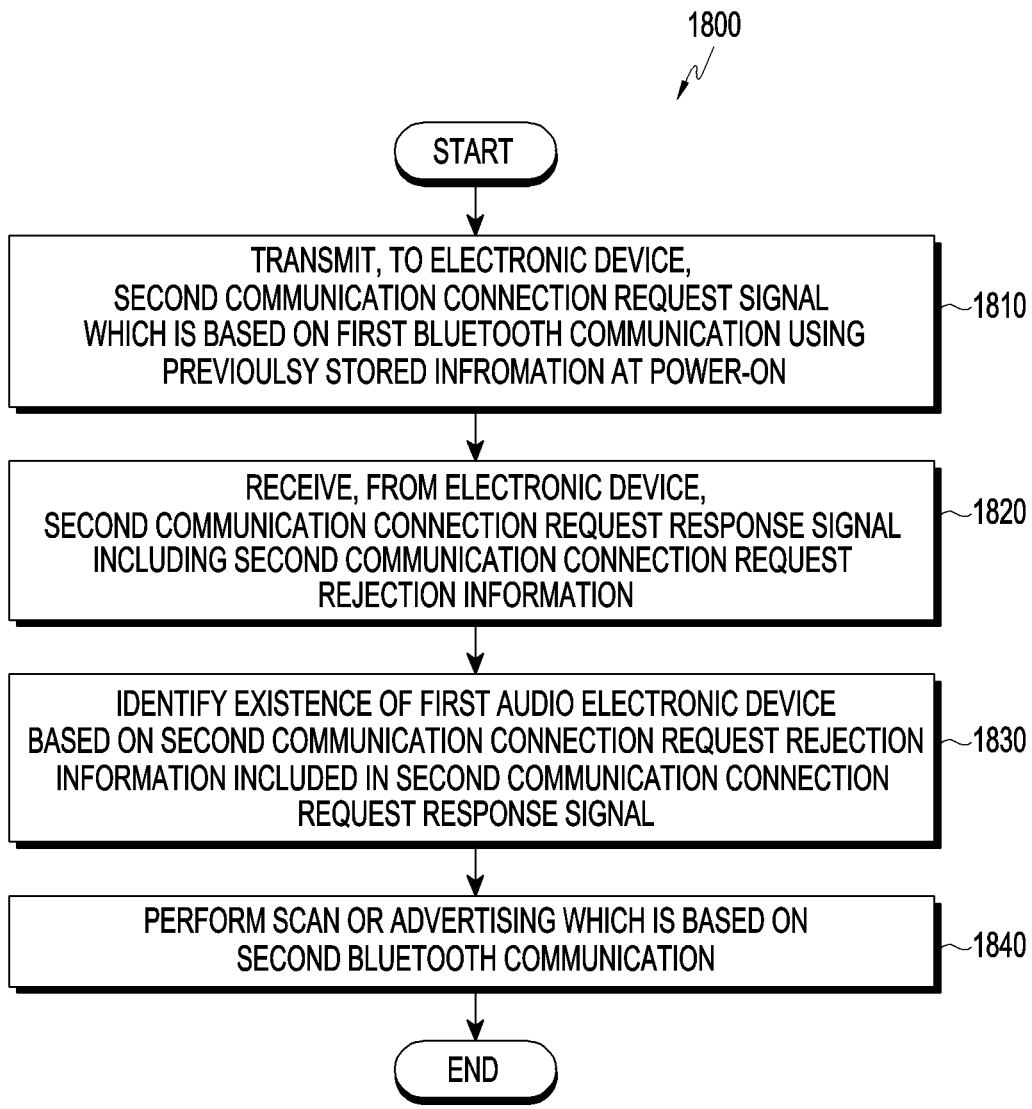
FIG. 18 is a flowchart illustrating an operation of a second audio electronic device according to an embodiment.

FIG. 18 is a flowchart 1800 illustrating an operation of a second audio electronic device according to an embodiment.

Referring to FIG. 18, it will be understood that operations 1810 to 1840 according to an embodiment are operations which are performed by a processor (e.g., the processor 1382 of FIG. 13) of a second audio electronic device 1403 (e.g., the electronic device 102 of FIG. 1, the audio electronic device 202 of FIG. 2, the second audio electronic device 303 of FIG. 3, the second audio electronic device 403 of FIG. 4, the second audio electronic device 1203 of FIG. 12, or the second audio electronic device 1303 of FIG. 13). According to an embodiment, at least one of operations 1810 to 1840 may be omitted, an order of some operations of the operations 1810 to 1840 may be changed, or another operation may be added.

In operation 1810, when being powered on, the second audio electronic device 1403 may perform a second communication connection request based on a first Bluetooth communication with the electronic device 1401 using previously stored information. For example, the second audio electronic device 1403 may transmit a page request signal based on Bluetooth legacy using a pre-stored first Bluetooth address (the same address as a first audio electronic device 1402). When a second communication connection request which uses the first Bluetooth address is received while being in the first communication connection which uses the first Bluetooth address, the electronic device 1401 may reject the second communication connection request because another communication connection may be limited to the same address.

In operation 1820, the second audio electronic device 1403 may receive, from the electronic device 1401, a second communication connection rejection response because the first Bluetooth communication with the first audio electronic device 1402 using the first Bluetooth address is already established. For example, the second communication connection rejection response may include a page response signal based on Bluetooth legacy that includes information indicating second communication connection rejection.

In operation 1830, the second audio electronic device 1403 may identify existence of the first audio electronic device 1402 based on the second communication connection rejection information included in the second communication connection request response signal.

In operation 1840, the second audio electronic device 1403 may perform a scan operation or an advertising operation for searching for the first audio electronic device 1402 based on a second Bluetooth (BLE) communication as the existence of the first audio electronic device 1402 is identified.

According to an embodiment, a method for a communication connection based on low energy in an audio electronic device (e.g., the electronic device 102 of FIG. 1, the audio electronic device 202 of FIG. 2, the second audio electronic device 303 of FIG. 3, the second audio electronic device 403 of FIG. 4, the second audio electronic device 1203 of FIG. 12, the second audio electronic device 1303 of FIG. 13, or the second audio electronic device 1403 of FIG. 14) is provided, and the method may include transmitting, to an external electronic device (e.g., the electronic device 101 of FIG. 1, the electronic device 301 of FIG. 3, the electronic device 401 of FIG. 4, the electronic device 1201 of FIG. 12, the electronic device 1301 of FIG. 13, or the electronic device 1401 of FIG. 14), a communication connection request signal based on a first Bluetooth communication and a first address stored in a memory, receiving, from the external electronic device through a Bluetooth communication circuit, a communication connection request response signal including communication connection request rejection information due to a first communication connection using the first address already being established, and identifying existence of an external audio electronic device (e.g., the electronic device 102 of FIG. 1, the audio electronic device 202 of FIG. 2, the first audio electronic device 302 of FIG. 3, the first audio electronic device 402 of FIG. 4, the first audio electronic device 1202 of FIG. 12, the first audio electronic device 1302 of FIG. 13, or the first audio electronic device 1402 of FIG. 14) based on the communication connection request response signal, and performing a scan or an advertising to establish a second communication connection based on a second Bluetooth communication with the external audio electronic device through the Bluetooth communication circuit.

Figure 19A:
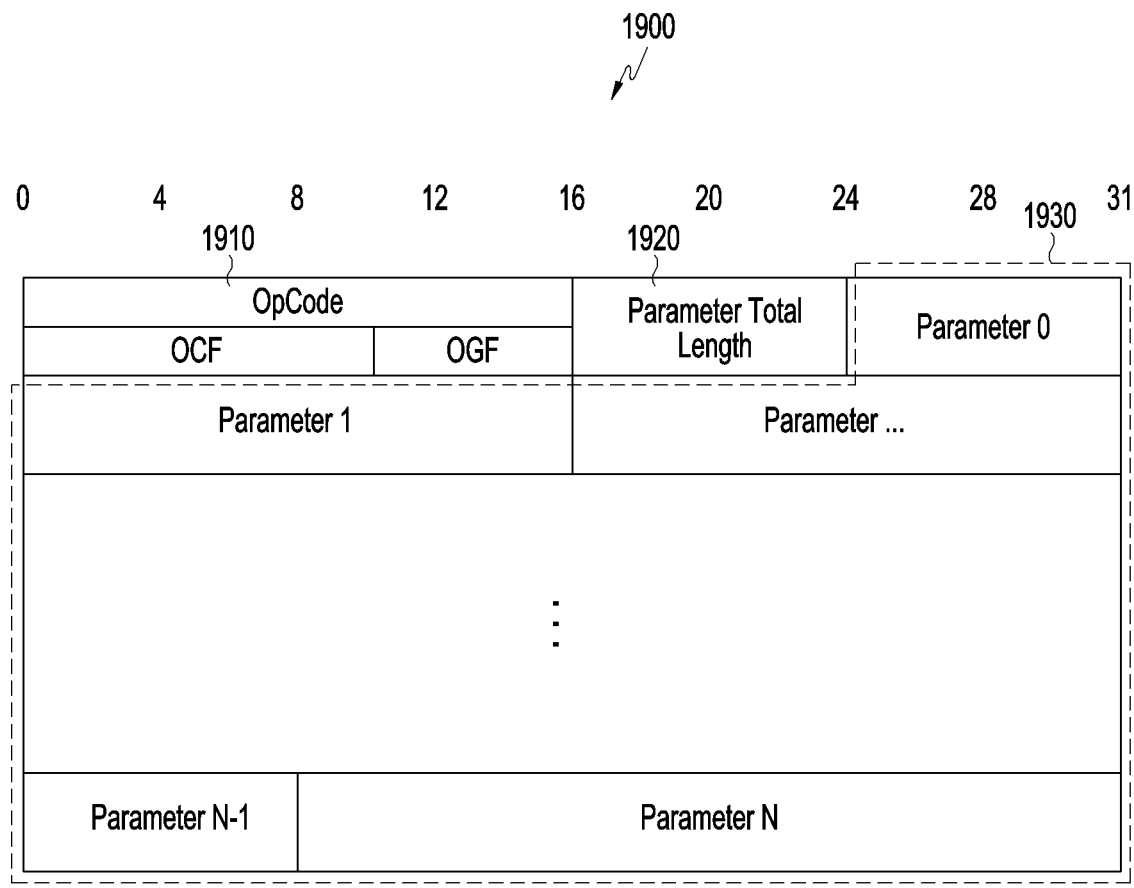
FIGS. 19A and 19B are diagrams for describing a page request according to an embodiment.
Figure 19B:
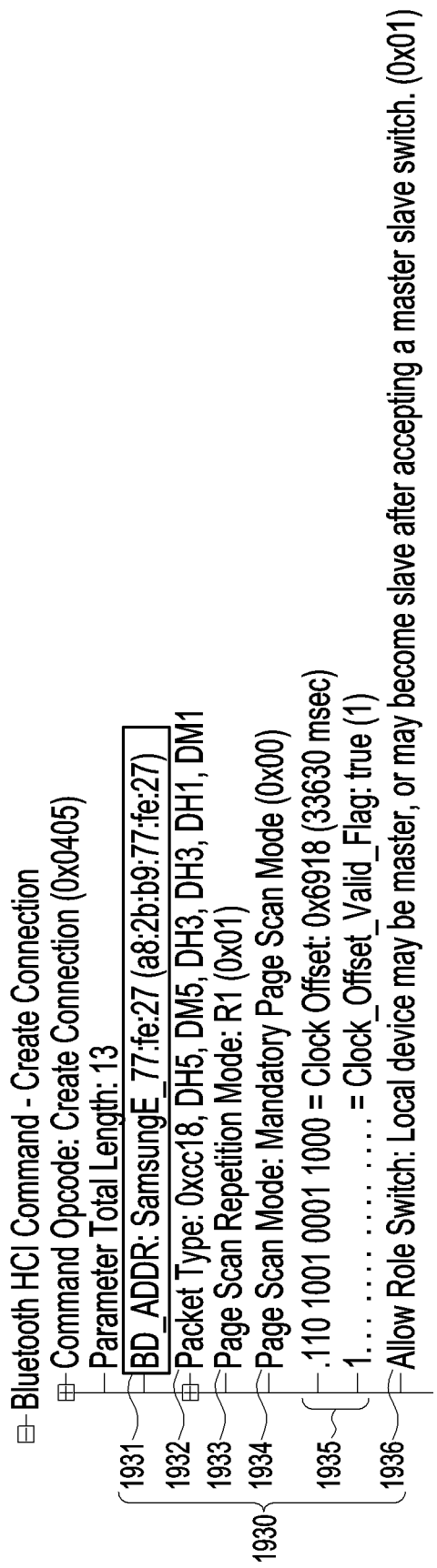

FIGS. 19A and 19B are diagrams for describing a page request according to an embodiment.

Referring to FIG. 19A, a second audio electronic device 1403 may transmit a page request using a host controller interface (HCl) command format 1900. The HCl command format 1900 may include an opcode field 1910, a parameter total length field 1920, and parameter fields 1930. For example, the opcode field 1910 may include an opcode value (e.g., 0x0405 (Create Connection)) assigned to the page request. The parameter total length field 1920 may include parameter length information. At least one of the parameter fields 1930 may include first Bluetooth address information of the second audio electronic device 1403.

Referring to FIG. 19B, the parameter fields 1930 may include a MAC address (e.g., SamsungE_77:fe:27(a8:2b:b9:77:fe:27)) of the second audio electronic device 1403 as first Bluetooth address information 1931, and may further include at least one of packet type information 1932, page scan repetition information 1933, page scan mode information 1934, clock information 1935, or role information as well as the first Bluetooth address information 1931.

Figure 20A:
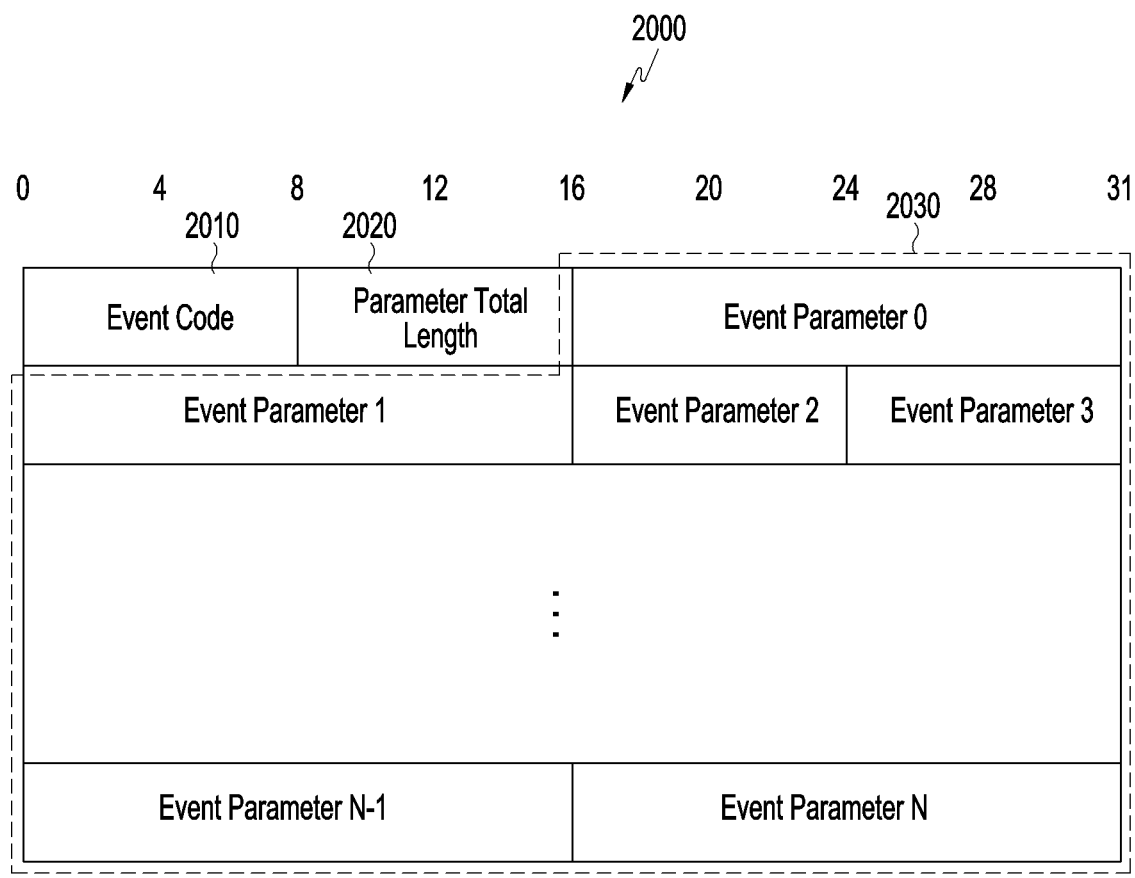
FIGS. 20A to 20C are diagrams for describing a page response according to an embodiment.
Figure 20B:
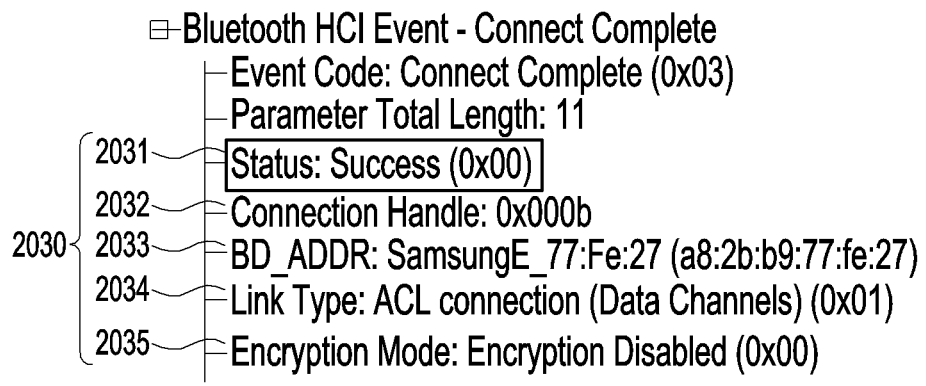
Figure 20C:
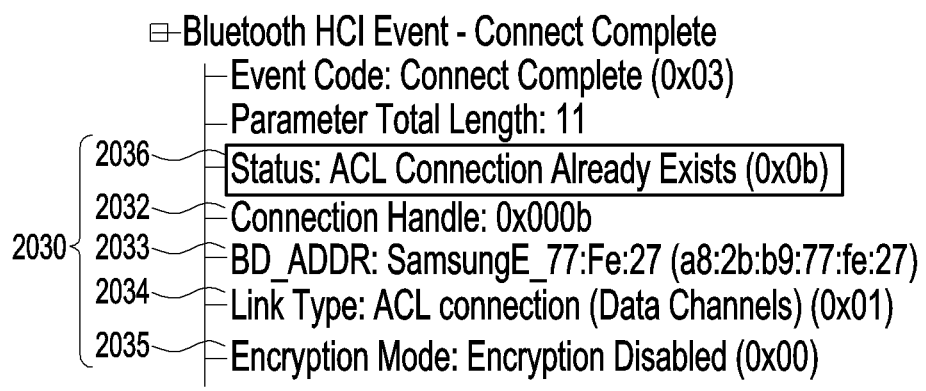

FIGS. 20A to 20C are diagrams for describing a page response according to an embodiment.

Referring to FIG. 20A, a first electronic device 1401 may transmit a page response using an HCl event format 2000. The HCl event format 2000 may include an event code field 2010, a parameter total length field 2020, and event parameter fields 2030. For example, the event code field 2010 may include an event code value (e.g., 0x03 (connect complete)) assigned to a connection request result (connection result or connect complete). The parameter total length field 2020 may include parameter length information. At least one of the parameter fields 2030 may include status information indicating connection success or connection failure.

Referring to FIG. 20B, the parameter fields 2030 may include connection success (e.g., success (0x00)) as status information 2031, and may further include at least one of connection handle information 2032, BD_ADDR information 2033, link type information 2034, or encryption mode information 2035.

Referring to FIG. 20C, the parameter fields 2030 may include connection failure (e.g., ACL Connection Already Exists) as status information 2036, and may further include at least one of connection handle information 2032, BD_ADDR information 2033, link type information 2034, or encryption mode information 2035. For example, ACL Connection Already Exists may be information indicating that the first audio electronic device 1402 is already in a first communication connection based on a first Bluetooth communication with the electronic device 1401.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, a storage medium (e.g., non-transitory computer-readable recording medium) storing commands is provided. The commands that, when executed by at least one processor, cause the at least one processor to perform at least one operation, and the at least one operation may include performing a first communication connection based on a first Bluetooth communication with a first audio electronic device having a first Bluetooth address using a Bluetooth communication circuit, receiving, from a second audio electronic device having the first Bluetooth address, a second communication connection request based on the first Bluetooth communication while performing the first communication connection, transmitting, to the second audio electronic device, a second communication connection request response signal including second communication connection request rejection information based on the first communication being connected by using the Bluetooth communication circuit, and transmitting, to the first audio electronic device, a message related to the second communication connection request rejection information through the first communication connection.

According to certain embodiments, an electronic device provides information indicating that a second audio electronic device exists on a network during a Bluetooth communication connection with a first audio electronic device in order to prompt the first audio electronic device to perform a scan or advertising operation for a Bluetooth communication connection with the second audio electronic device, so it is possible to prevent unnecessary power consumption by preventing performance of the scan or advertising operation if the second audio electronic device does not exist on the network.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

Embodiments of the present disclosure in the present specification and drawings merely present a certain example to easily describe the technical contents according to the embodiments of the present disclosure and to help understanding of the embodiments of the present disclosure, and do not limit the scope of the embodiments of the present disclosure. Therefore, the scope of various embodiments of the present disclosure should be interpreted to include all changes or modifications derived based on the technical spirit of the various embodiments of the present disclosure as well as the embodiments of the disclosure.

What is claimed is:

1. An electronic device comprising:
   a communication circuit configured to support Bluetooth legacy communication and Bluetooth low energy communication;
   an audio processing circuit;
   a memory; and
   at least one processor which is operatively connected with the communication circuit, the audio processing circuit, and the memory, and the at least one processor is configured to:
   perform a first communication connection based on a first communication with a first audio electronic device having a first address by using the communication circuit,
   receive, from a second audio electronic device having the first address, a second communication connection request based on the first communication while the first communication connection is established, and transmit, to the first audio electronic device having the first address through the first communication connection, a message related to rejection information for the second communication connection request received from second audio electronic device having the first address.

2. The electronic device of claim 1, wherein the first communication is basic rate (BR)/enhanced data rate (EDR) communication, the Bluetooth legacy communication, or the Bluetooth low energy communication.

3. The electronic device of claim 1, wherein the at least one processor is configured to transmit, to the second audio electronic device, a second communication connection request response signal including the rejection information for the received second communication connection request by using the communication circuit, and
wherein the second communication connection request based on the first communication is a page request that is based on the Bluetooth legacy communication, and the second communication connection request response signal is a page response based on the Bluetooth legacy communication.

4. The electronic device of claim 1, wherein the at least one processor is configured to transmit, to the second audio electronic device, a second communication connection request response signal including the rejection information for the received second communication connection request by using the communication circuit, and
wherein the message related to the rejection information includes indication indicating that the electronic device transmitted, to the second audio electronic device, the second communication connection request response signal.

5. The electronic device of claim 1, wherein the message related to the rejection information includes a serial port profile (SPP) message.

6. An audio electronic device comprising:
a communication circuit configured to support Bluetooth legacy communication and Bluetooth low energy communication;
an audio processing circuit;
a memory; and
at least one processor which is operatively connected with the communication circuit, the audio processing circuit, and the memory, and the at least one processor is configured to:
perform a first communication connection based on a first communication with an external electronic device by using a first address through the communication circuit, and
refrain from performing a scan or an advertising for a second communication connection based on a second communication with an external audio electronic device having the first address through the communication circuit until after identifying existence of the external audio electronic device while the first communication connection is established.

7. The audio electronic device of claim 6, wherein the first communication is basic rate (BR)/enhanced data rate (EDR) communication or Bluetooth legacy communication, and the second communication is Bluetooth low energy (BLE) communication.

8. The audio electronic device of claim 6, wherein the at least one processor is configured to identify the existence of the external audio electronic device based on reception of information related to a second communication connection request rejection received from the external electronic device, while the first communication connection is established, wherein the second communication connection request rejection is generated in response to a communication request based on the first communication transmitted from the external audio electronic device to the external electronic device.

9. The audio electronic device of claim 6, wherein the at least one processor is configured to identify the existence of the external audio electronic device based on a second communication connection request rejection response signal that is transmitted from the external electronic device to the external audio electronic device, wherein the second communication connection request rejection response signal is generated in response to a communication request based on the first communication and the first address transmitted from the external audio electronic device to the external electronic device.

10. The audio electronic device of claim 6, wherein the at least one processor is configured to transmit, to the external audio electronic device, information related to the first communication connection when the second communication connection is performed with the external audio electronic device.

11. An audio electronic device comprising:
a communication circuit configured to support Bluetooth legacy communication and Bluetooth low energy communication;
an audio processing circuit;
a memory; and
at least one processor which is operatively connected with the communication circuit, the audio processing circuit, and the memory, and the at least one processor is configured to:
transmit, to an external electronic device, a communication connection request signal based on a first communication and a first address stored in the memory,
receive, from the external electronic device through the communication circuit, a communication connection request response signal including rejection information for a communication connection request using the first address,
identify existence of an external audio electronic device based on the communication connection request response signal, and
perform a scan or an advertising to establish a second communication connection based on a second communication with the external audio electronic device through the communication circuit,
wherein the at least one processor is configured to refrain from performing the scan or the advertising before identifying the existence of the external audio electronic device.

12. The audio electronic device of claim 11, wherein the communication connection request signal is a page request based on the Bluetooth legacy communication, and the communication connection request response signal is a page response based on the Bluetooth legacy communication.

13. The audio electronic device of claim 11, wherein the at least one processor is configured to:
receive, from the external audio electronic device, information related to a first communication connection when the second communication connection is established with the external audio electronic device, and
obtain data transmitted from the external electronic device using the received information related to the first communication connection.

14. A method for a communication connection based on low energy in an electronic device, the method comprising:

performing a first communication connection based on a first communication with a first audio electronic device having a first address using a communication circuit configured to support Bluetooth legacy communication and Bluetooth low energy communication;

receiving, from a second audio electronic device having the first address, a second communication connection request based on the first communication while the first communication connection is established; and transmitting, to the first audio electronic device having the first address through the first communication connection, a message related to rejection information for the second communication connection request received from the second audio electronic device having the first address.

15. The method of claim 14, wherein the first communication is basic rate (BR)/enhanced data rate (EDR) communication, the Bluetooth legacy communication, or the Bluetooth low energy communication.

16. The method of claim 14, further comprising:

transmitting, to the second audio electronic device, a second communication connection request response signal including rejection information for the received second communication connection request by using the communication circuit, wherein the second communication connection request based on the first communication is a page request that is based on the Bluetooth legacy communication, and the second communication connection request response signal is a page response based on the Bluetooth legacy communication.

17. The method of claim 14, further comprising:

transmitting, to the second audio electronic device, a second communication connection request response signal including rejection information for the received second communication connection request by using the communication circuit, wherein the message related to the rejection information includes indication indicating that the electronic device transmitted, to the second audio electronic device, the second communication connection request response signal.

18. A method for a communication connection based on low energy in an audio electronic device, the method comprising:

performing a first communication connection based on a first communication with an external electronic device by using a first address through a communication circuit configured to support Bluetooth legacy communication and Bluetooth low energy communication;

identifying existence of an external audio electronic device having the first address while the first communication connection is established; and refraining from performing a scan or an advertising for a second communication connection based on a second communication with the external audio electronic device using the communication circuit until after identifying the existence of the external audio electronic device.

19. The method of claim 18, wherein the first communication is basic rate (BR)/enhanced data rate (EDR) communication or Bluetooth legacy communication, and the second communication is Bluetooth low energy (BLE) communication.

20. A method for a communication connection based on low energy in an audio electronic device, the method comprising:

transmitting, to an external electronic device, a communication connection request signal based on a first communication and a first address stored in a memory;

receiving, from the external electronic device through a communication circuit configured to support Bluetooth legacy communication and Bluetooth low energy communication, a communication connection request response signal including rejection information;

identifying existence of an external audio electronic device based on the communication connection request response signal;

refraining from performing a scan or an advertising to establish a second communication connection based on a second communication with the external audio electronic before identifying the existence of the external audio electronic device; and performing the scan or the advertising to establish the second communication connection with the external audio electronic device after identifying the existence of the external audio electronic device through the communication circuit.

* * * * *

UNITED STATES PATENT AND TRADEMARK OFFICE
CERTIFICATE OF CORRECTION

| | |
|---|---|
| PATENT NO. | : 11,497,072 B2 |
| APPLICATION NO. | : 16/917990 |
| DATED | : November 8, 2022 |
| INVENTOR(S) | : Donghyeon Kim et al. |

It is certified that error appears in the above-identified patent and that said Letters Patent is hereby corrected as shown below:

In the Claims

Column 39, Claim 1, Line 5 should read as follows:
--...from the second audio electronic device...--

Signed and Sealed this
Twentieth Day of December, 2022

Katherine Kelly Vidal
*Director of the United States Patent and Trademark Office*